United States Patent
Tanaka et al.

(10) Patent No.: US 9,865,892 B2
(45) Date of Patent: Jan. 9, 2018

(54) FUEL CELL SYSTEM AND METHOD FOR OPERATING THE SAME

(75) Inventors: Yoshikazu Tanaka, Shiga (JP); Kiyoshi Taguchi, Osaka (JP); Yoshio Tamura, Hyogo (JP); Shigeki Yasuda, Osaka (JP); Hiroaki Kaneko, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1277 days.

(21) Appl. No.: 13/262,131

(22) PCT Filed: Mar. 9, 2010

(86) PCT No.: PCT/JP2010/001657
§ 371 (c)(1),
(2), (4) Date: Sep. 29, 2011

(87) PCT Pub. No.: WO2010/116609
PCT Pub. Date: Oct. 14, 2010

(65) Prior Publication Data
US 2012/0028144 A1  Feb. 2, 2012

(30) Foreign Application Priority Data

Mar. 30, 2009 (JP) ................. 2009-082945
Mar. 8, 2010 (JP) ................. 2010-051133

(51) Int. Cl.
*H01M 8/0606* (2016.01)
*H01M 8/04223* (2016.01)
(Continued)

(52) U.S. Cl.
CPC ..... *H01M 8/0606* (2013.01); *H01M 8/04022* (2013.01); *H01M 8/04223* (2013.01);
(Continued)

(58) Field of Classification Search
CPC .................. H01M 8/04022; H01M 8/0606
See application file for complete search history.

(56) References Cited

U.S. PATENT DOCUMENTS 8,119,294 B2 * 2/2012 Song ................. H01M 8/04238
429/400
2002/0078628 A1 6/2002 Okada et al.
(Continued)

FOREIGN PATENT DOCUMENTS

JP 63-086269 A 4/1988
JP 08-315842 A 11/1996
(Continued)

OTHER PUBLICATIONS

Extended European Search Report for European Application No. 10761317.6, dated Apr. 15, 2013, 6 pages.
(Continued)

*Primary Examiner* — Alix Eggerding
(74) *Attorney, Agent, or Firm* — McDermott Will & Emery LLP

(57) ABSTRACT

Provided are a fuel cell system capable of shortening the wait time of an observer who confirms set points of a system interconnection protective device before starting a system interconnection operation, and a method for operating the fuel cell system.
A fuel cell system 100 includes: a hydrogen generating unit 16 configured to generate a hydrogen-containing gas by using a raw material; a heater 18 configured to heat the hydrogen generating unit; an electric power generation start command unit 32 configured to receive a command of start of an electric power generating operation of the fuel cell system, the command being input by a manual operation of an operator, the electric power generating operation being interconnected with an electric power system; and a controller 28 configured to: execute electric power generation
(Continued)

stand-by, in which the fuel cell system stands by for the start of the electric power generating operation interconnected with the electric power system, while executing a temperature maintaining process of the hydrogen generating unit by the heater after completion of a temperature increasing process of the hydrogen generating unit by the heater; and when the electric power generation start command unit receives the command of the start of the electric power generating operation, stop the electric power generation stand-by and start the electric power generating operation interconnected with the electric power system.

16 Claims, 8 Drawing Sheets

(51) Int. Cl.
*H01M 8/04955* (2016.01)
*H01M 8/04014* (2016.01)
*H01M 8/0432* (2016.01)
*H01M 8/04701* (2016.01)
*H01M 8/04746* (2016.01)

(52) U.S. Cl.
CPC ... *H01M 8/04373* (2013.01); *H01M 8/04738* (2013.01); *H01M 8/04776* (2013.01); *H01M 8/04955* (2013.01); *H01M 2250/10* (2013.01); *Y02B 90/14* (2013.01)

(56) References Cited

U.S. PATENT DOCUMENTS

| | | |
|---|---|---|
| 2003/0035983 A1 | 2/2003 | Ukai et al. |
| 2003/0124400 A1* | 7/2003 | Hara ............... H01M 8/04686 429/425 |
| 2003/0148154 A1* | 8/2003 | Kawasumi et al. ............ 429/20 |
| 2004/0228055 A1* | 11/2004 | Pearson ..................... 361/93.1 |
| 2004/0241512 A1* | 12/2004 | Muto et al. ..................... 429/23 |
| 2005/0164051 A1* | 7/2005 | Venkataraman et al. ....... 429/17 |
| 2005/0255353 A1 | 11/2005 | Komachiya et al. |
| 2006/0090397 A1 | 5/2006 | Edlund et al. |
| 2008/0176118 A1* | 7/2008 | Edlund ............ H01M 8/04089 429/423 |

FOREIGN PATENT DOCUMENTS

| | | |
|---|---|---|
| JP | 2001-180906 A | 7/2001 |
| JP | 2002-008686 A | 1/2002 |
| JP | 2002-063927 A | 2/2002 |
| JP | 2005-044572 A | 2/2005 |
| JP | 2005-222857 A | 8/2005 |
| WO | WO 01/26174 A1 | 4/2001 |

OTHER PUBLICATIONS

International Search Report for International Application No. PCT/JP2010/001657, dated Jun. 22, 2010, 2 pages.

* cited by examiner

FUEL CELL SYSTEM AND METHOD FOR OPERATING THE SAME

This application is a 371 application of PCT/JP2010/001657 having an international filing date of Mar. 9, 2010, which claims priority to JP2009-082945 filed on Mar. 30, 2009 and JP 2010-051133 filed on Mar. 8, 2010, the entire contents of which are incorporated herein by reference.

TECHNICAL FIELD

The present invention relates to a fuel cell system configured to include a fuel cell, such as a polymer electrolyte fuel cell or a phosphoric-acid fuel cell, and supply electricity, and a method for operating the fuel cell system.

BACKGROUND ART

A fuel cell system using a fuel cell, such as a polymer electrolyte fuel cell or a phosphoric-acid fuel cell, configured to generate electric power by a reaction between hydrogen and oxygen is constituted by: a hydrogen generator configured to generate a fuel gas containing a large amount of hydrogen by a steam-reforming reaction from a hydrocarbon material, such as a city gas, propane, or kerosene; an air supply device configured to supply air as an oxidizing gas; and an electric power converter configured to convert DC power, generated by the fuel cell, into AC power. In some fuel cell systems, the electric power converter converts the DC power, generated by the fuel cell, into the AC power to supply the AC power to home electric power loads and interconnects an electric power system. With this, when the amount of electric power generated by the fuel cell system is smaller than a home electric power demand, the shortfall is compensated by the electric power system (commercial system). In contrast, when the amount of electric power generated by the fuel cell system is too large, the excess flows to the electric power system as a reverse power flow.

A method for operating such fuel cell system includes: a start-up step of increasing the temperature of the hydrogen generator up to a temperature suitable for the reaction (for example, PTL 1); an electric power generating step of, when the temperatures of respective portions of the hydrogen generator have reached predetermined temperatures, supplying the fuel gas from the hydrogen generator and the air from the air supply device to the fuel cell to obtain the electric power; and a stop step of terminating the electric power generation and performing a cooling or internal treatment such that the fuel cell and the hydrogen generator can be preserved till the next electric power generation.
PTL 1: Japanese Patent No. 3415086

SUMMARY OF THE INVENTION

Technical Problem

A conventional fuel cell system interconnects the electric power system to realize system interconnection. If the electric power is carelessly supplied from the fuel cell system to the electric power system, the electric power system may be adversely affected by the reverse power flow. In a case where the fuel cell system is installed for the first time, it is normally necessary that an employee (observer) of an electric power company confirms that set points of a system interconnection protective device are proper, and then, the electric power generation is started with the system interconnection realized.

In a start-up process of the fuel cell system, it requires a long time, such as several tens of minutes or an hour or more, especially to increase the temperature of the hydrogen generator. In the conventional fuel cell system, immediately after the temperature of the hydrogen generator increases up to a temperature suitable for a reaction of the generation of the hydrogen-containing gas, the hydrogen-containing gas is supplied to the fuel cell, and the fuel cell starts generating the electric power. In a case where the fuel cell system is started up in advance to shorten the wait time of the observer, the observer may be late for the start of the electric power generation. This is because the arrival time of the observer changes depending on the change in traffic conditions. Therefore, in order that the observer surely observes the start of the electric power generation, the start-up process has to be started after the arrival of the observer. In accordance with this start-up process, the wait time of the observer is long, and a work efficiency deteriorates.

The present invention was made to solve the above conventional problem, and an object of the present invention is to provide a fuel cell system capable of shortening the wait time of the observer who confirms the set points of the system interconnection protective device before starting a system interconnection operation, and a method for operating the fuel cell system.

Solution to Problem

To solve the above problems, a fuel cell system of the present invention includes: a hydrogen generating unit configured to generate a hydrogen-containing gas by using a raw material; a heater configured to heat the hydrogen generating unit; an electric power generation start command unit configured to receive a command of start of an electric power generating operation of the fuel cell system, the command being input by a manual operation of an operator, the electric power generating operation being interconnected with an electric power system; and a controller configured to: execute electric power generation stand-by, in which the fuel cell system stands by for the start of the electric power generating operation interconnected with the electric power system, while executing a temperature maintaining process of the hydrogen generating unit by the heater after completion of a temperature increasing process of the hydrogen generating unit by the heater; and when the electric power generation start command unit receives the command of the start of the electric power generating operation, stop the electric power generation stand-by and start the electric power generating operation interconnected with the electric power system.

In accordance with this configuration, it is possible to shorten the wait time of the observer who confirms the set points of the system interconnection protective device before starting the system interconnection operation.

The above object, other objects, features and advantages of the present invention will be made clear by the following detailed explanation of preferred embodiments with reference to the attached drawings.

Advantageous Effects of Invention

As explained above, in accordance with the fuel cell system and its operating method of the present invention, even if the temperature increasing process of the hydrogen generating unit is completed, the start of the electric power generating operation of the fuel cell system interconnecting the electric power system stands by until the input of the electric power generation start command to the electric power generation start command unit. Therefore, the wait time of the observer who confirms the set points of the system interconnection protective device before starting the system interconnection operation can be shortened by starting the start-up process of the fuel cell system in advance before the arrival of the observer.

DETAILED DESCRIPTION OF THE PREFERRED EMBODIMENTS

Figure 1:
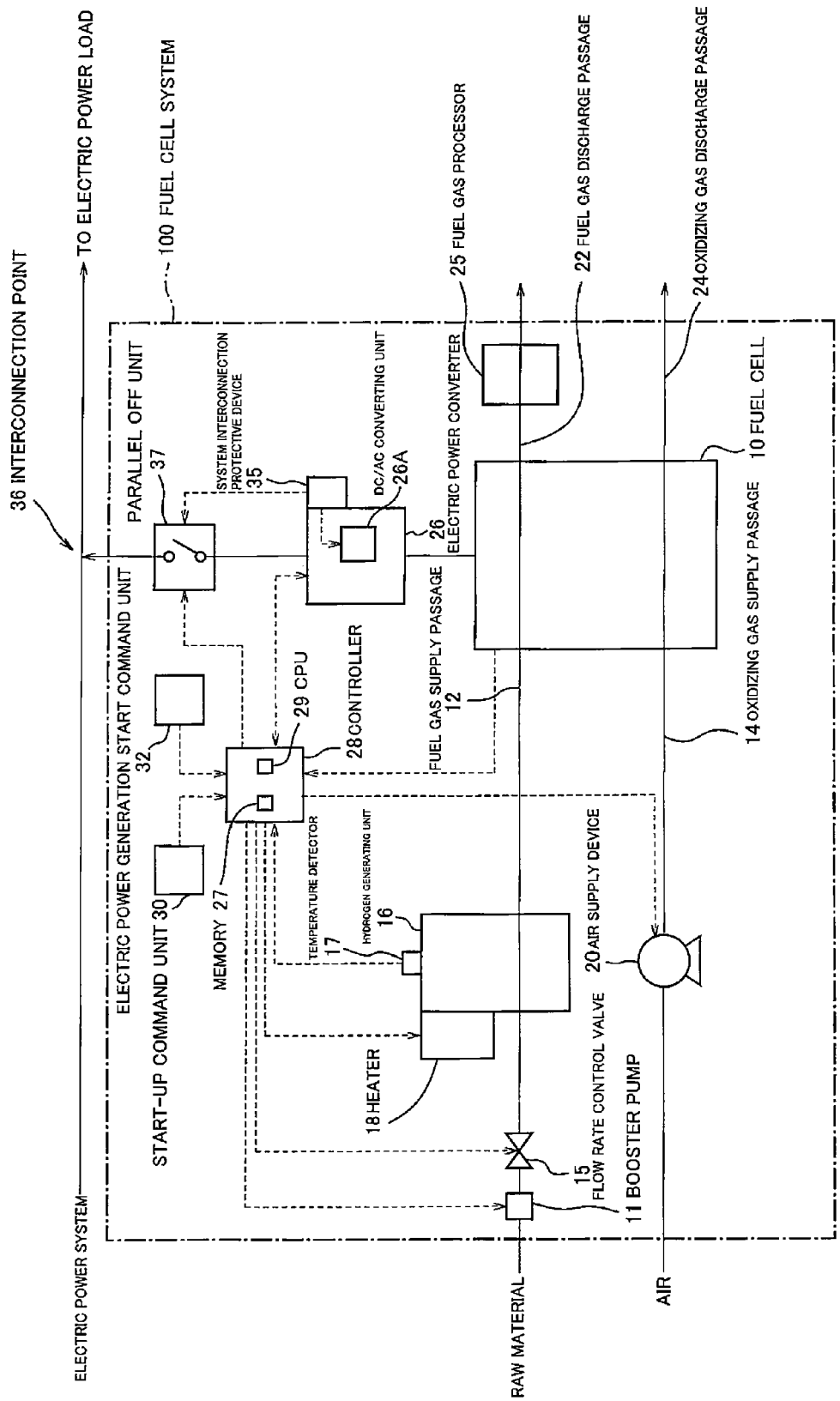
FIG. 1 is a block diagram showing one example of the schematic configuration of a fuel cell system of Embodiment 1 of the present invention.

Hereinafter, embodiments of the present invention will be explained in reference to the drawings.

A fuel cell system according to a first aspect includes: a hydrogen generating unit configured to generate a hydrogen-containing gas by using a raw material; a heater configured to heat the hydrogen generating unit; an electric power generation start command unit configured to receive a command of start of an electric power generating operation of the fuel cell system, the command being input by a manual operation of an operator, the electric power generating operation being interconnected with an electric power system; and a controller configured to: execute electric power generation stand-by, in which the fuel cell system stands by for the start of the electric power generating operation interconnected with the electric power system, after completion of a temperature increasing process of the hydrogen generating unit by the heater; and when the electric power generation start command unit receives the command of the start of the electric power generating operation, stop the electric power generation stand-by and start the electric power generating operation interconnected with the electric power system.

In accordance with this configuration, the wait time of an observer who confirms set points of a system interconnection protective device before starting a system interconnection operation can be made shorter than that of the conventional fuel cell system.

Here, the "electric power generating operation interconnected with the electric power system" denotes the electric power generating operation executed with the fuel cell system connected to the electric power system (with the system interconnection realized). Specifically, for example, the "electric power generating operation interconnected with the electric power system" denotes that the electric power generating operation of the fuel cell system is executed in a state where the electric power system and the fuel cell system are electrically connected to each other via a parallel off unit disposed on an electric path connecting the electric power system and an exit of an electric power converter configured to convert output electric power of a fuel cell. The parallel off unit can electrically connect and disconnect the electric power system and the fuel cell system.

The above "temperature increasing process" is defined as a process of increasing the temperature of the hydrogen generating unit by the heater up to a temperature which is equal to or higher than a lower temperature limit at which the hydrogen generating unit can generate the hydrogen-containing gas or up to a temperature which is lower than this lower temperature limit but can be increased up to the lower temperature limit or higher immediately (for example, within several minutes).

The fuel cell system according to a second aspect is configured such that in the fuel cell system of the first aspect, the controller executes a temperature maintaining process of the hydrogen generating unit by the heater during the electric power generation stand-by.

Here, the above "temperature maintaining process" is a process of maintaining the temperature of the hydrogen generating unit heated by the temperature increasing process. However, the above "temperature maintaining process" is not limited to the process of maintaining the temperature at the time of the completion of the temperature increasing process, and may be a process of maintaining the hydrogen generating unit at a temperature lower than the temperature at the time of the completion of the temperature increasing process. It is preferable that the temperature maintained by the temperature maintaining process be a temperature which is equal to or higher than the lower temperature limit at which the hydrogen generating unit can generate the hydrogen-containing gas or a temperature which can be immediately (for example, within several minutes) increased up to the lower temperature limit or higher after the electric power generation start command unit receives the electric power generation start command. A heating operation by the heater in the temperature maintaining process may be performed continuously or intermittently.

The fuel cell system according to a third aspect is configured such that in the fuel cell system of the second aspect, the heater is a combustor, and during the electric power generation stand-by, the combustor executes the temperature maintaining process by using the hydrogen-containing gas supplied from the hydrogen generating unit.

In accordance with this configuration, the electric power generation stand-by is executed while generating the hydrogen-containing gas by the hydrogen generating unit. Therefore, after the electric power generation start command unit receives the electric power generation start command, the electric power generating operation interconnected with the electric power system can be started immediately. On this account, the wait time of the observer who confirms the set points of the system interconnection protective device before starting the system interconnection operation can be further made shorter than that of a fuel cell system in which the hydrogen generating unit does not generate the hydrogen-containing gas during the electric power generation stand-by.

The fuel cell system according to a fourth aspect is configured such that in the fuel cell system of the third aspect, the controller stands by for the electric power generating operation of the fuel cell system during the electric power generation stand-by, and the hydrogen-containing gas from the hydrogen generating unit is not consumed by the electric power generating operation of the fuel cell system but is supplied to the combustor. In this aspect, the hydrogen-containing gas generated by the hydrogen generating unit may be or may not be supplied to the fuel cell.

The fuel cell system according to a fifth aspect is configured such that the fuel cell system of any one of the first to fourth aspect further includes an internal electric power load, wherein the controller is configured to, during the electric power generation stand-by, start the electric power generating operation of the fuel cell system and supply electric power, generated by the electric power generating operation, to the internal electric power load.

In accordance with this configuration, the hydrogen-containing gas generated by the hydrogen generating unit during the electric power generation stand-by can be effectively utilized as the electric power by the electric power generation of the fuel cell system. Therefore, the energy efficiency of the fuel cell system becomes higher than that of the fuel cell system of the third aspect in which the electric power generation stand-by continues without utilizing the generated hydrogen-containing gas in the electric power generation.

The fuel cell system according to a sixth aspect is configured such that the fuel cell system of any one of the first to the fifth aspect further includes a temperature detector configured to detect a temperature of the hydrogen generating unit, wherein the controller is configured to control a heat amount of the heater during the electric power generation stand-by such that the temperature detected by the temperature detector becomes equal to or lower than a heatproof temperature of the hydrogen generating unit.

In accordance with this configuration, the excessive temperature increase of the hydrogen generating unit is suppressed during the electric power generation stand-by. Especially, in the fuel cell system of the third aspect, the hydrogen-containing gas generated by the hydrogen generating unit is not consumed in the electric power generation but is combusted in the combustor, so that the temperature of the hydrogen generating unit may increase excessively. However, by controlling the amount of raw material supplied to the hydrogen generating unit such that the temperature of the hydrogen generating unit becomes equal to or lower than the heatproof temperature, the excessive temperature increase of the hydrogen generating unit is suppressed.

The fuel cell system according to a seventh aspect is configured such that the fuel cell system of the fourth aspect further includes a raw material supply unit configured to supply the raw material to the hydrogen generating unit, wherein the controller controls the raw material supply unit during the electric power generation stand-by such that an amount of raw material supplied by the raw material supply unit becomes smaller than a raw material supply amount set to correspond to a maximum electric power generation amount of the fuel cell system.

In the fuel cell system of the fourth aspect, as described above, the temperature of the hydrogen generating unit may increase excessively. By adopting the seventh aspect, the possibility of the excessive temperature increase of the hydrogen generating unit becomes lower than that of a case where the raw material, the amount of which is set to corresponding to the maximum electric power generation amount, is supplied to the hydrogen generating unit, and the electric power generation stand-by is executed.

The fuel cell system according to an eighth aspect is configured such that the fuel cell system of the fourth aspect further includes a raw material supply unit configured to supply the raw material to the hydrogen generating unit, wherein the controller controls the raw material supply unit during the electric power generation stand-by such that an amount of raw material supplied by the raw material supply unit becomes smaller than a raw material supply amount set to correspond to an intermediate electric power generation amount of the fuel cell system.

In the fuel cell system of the fourth aspect, as described above, the temperature of the hydrogen generating unit may increase excessively. By adopting the eighth aspect, the possibility of the excessive temperature increase of the hydrogen generating unit becomes lower than that of a case where the raw material, the amount of which is set to correspond to the electric power generation amount equal to or larger than the intermediate electric power generation amount, is supplied to the hydrogen generating unit, and the electric power generation stand-by is executed.

The fuel cell system according to a ninth aspect is configured such that the fuel cell system of the fourth aspect further includes a raw material supply unit configured to supply the raw material to the hydrogen generating unit, wherein the controller controls the raw material supply unit during the electric power generation stand-by such that an amount of raw material supplied by the raw material supply unit becomes smaller than a raw material supply amount set to correspond to a minimum electric power generation amount of the fuel cell system.

In the fuel cell system of the fourth aspect, as described above, the temperature of the hydrogen generating unit may increase excessively. By adopting the ninth aspect, the possibility of the excessive temperature increase of the hydrogen generating unit becomes lower than that of a case where the raw material, the amount of which is set to correspond to a predetermined electric power generation amount of the fuel cell system, is supplied to the hydrogen generating unit, and the electric power generation stand-by is executed.

The fuel cell system according to a tenth aspect is configured such that in the fuel cell system of the ninth aspect, the controller is configured to, when the electric power generation start command unit receives the command of the start of the electric power generating operation, stop the electric power generation stand-by, control the raw material supply unit such that the amount of raw material supplied by the raw material supply unit becomes the raw material supply amount set to correspond to the minimum electric power generation amount of the fuel cell system, and start the electric power generating operation interconnected with the electric power system.

When starting the electric power generating operation interconnected with the electric power system, the raw material supply unit is typically controlled such that the amount of raw material supplied becomes an amount which is set to correspond to the electric power generation amount of the fuel cell system, the electric power generation amount corresponding to the electric power demand of an external electric power load. Therefore, there is a possibility that the temperature of the hydrogen generating unit increases excessively before the electric power generation of the fuel cell system is started. However, by adopting the tenth aspect, the above possibility is reduced since the raw material, the amount of which is set to correspond to the minimum electric power generation amount, is supplied to the hydrogen generating unit regardless of the demand of the external electric power load.

The fuel cell system according to an eleventh aspect is configured such that the fuel cell system of any one of the seventh to tenth aspects further includes: an air supply unit configured to supply combustion air to the combustor; and a temperature detector configured to detect a temperature of the hydrogen generating unit, wherein when the temperature detected by the temperature detector increases during the electric power generation stand-by, the controller increases an amount of air supplied from the air supply unit.

In the fuel cell system of the fourth aspect, as described above, the temperature of the hydrogen generating unit may increase excessively. However, by adopting the eleventh aspect, the possibility of the excessive temperature increase of the hydrogen generating unit is reduced.

The fuel cell system according to a twelfth aspect is configured such that the fuel cell system of any one of the first to fifth aspects further includes a temperature detector configured to detect a temperature of the hydrogen generating unit, wherein the controller controls the heater during the electric power generation stand-by such that the temperature detected by the temperature detector becomes equal to or higher than a lower temperature limit at which the hydrogen generating unit is able to generate the hydrogen-containing gas.

In accordance with this configuration, the hydrogen generating unit can generate the hydrogen-containing gas immediately after the electric power generation start command unit receives the electric power generation start command. Therefore, the electric power generating operation interconnected with the electric power system can be started immediately. On this account, the wait time of the observer who confirms the set points of the system interconnection protective device before starting the system interconnection operation can be further made shorter than that of a case where the temperature of the hydrogen generating unit is maintained at a temperature lower than the above lower limit in the temperature maintaining process.

The fuel cell system according to a thirteenth aspect is configured such that in the fuel cell system of the first aspect, the controller is configured to, when an upper stand-by time limit has elapsed since start of the electric power generation stand-by, stop the electric power generation stand-by and start the electric power generating operation interconnected with the electric power system.

In accordance with this configuration, it is possible to prevent a case where when the arrival of the observer is behind schedule, the electric power generation stand-by endlessly continues, and the amount of energy consumed by the electric power generation stand-by increases.

The fuel cell system according to a fourteenth aspect is configured such that in the fuel cell system of the first aspect, the controller is configured to stop the electric power generation stand-by when an upper stand-by time limit has elapsed since start of the electric power generation stand-by.

In accordance with this configuration, it is possible to prevent a case where when the arrival of the observer is behind schedule, the electric power generation stand-by endlessly continues, and the amount of energy increases.

The fuel cell system according to a fifteenth aspect is configured such that the fuel cell system of the first aspect further includes: a first operation command unit configured to command a first operation method; and a second operation command unit configured to command a second operation method, wherein the controller is configured to: in a case where the first operation method is commanded by the first operation command unit, execute the electric power generation stand-by after the completion of the temperature increasing process of the hydrogen generating unit, and stop the electric power generation stand-by and start the electric power generating operation interconnected with the electric power system by an input of the command of the start of the electric power generating operation to the electric power generation start command unit; and in a case where the second operation method is commanded by the second operation command unit, start the electric power generating operation interconnected with the electric power system after the completion of the temperature increasing process of the hydrogen generating unit, without executing the electric power generation stand-by.

In accordance with this configuration, it is possible to prevent the consumption of energy by the unnecessary execution of the electric power generation stand-by at the time of an operation start of the fuel cell system, the operation start being performed after an operation start performed under the observation of the observer.

A method for operating a fuel cell system according to a first aspect is a method for operating a fuel cell system including: a hydrogen generating unit having a reformer configured to generate a hydrogen-containing gas by using a raw material; a heater configured to heat the reformer; and an electric power generation start command unit configured to receive a command of start of an electric power generating operation of the fuel cell system, the command being input by a manual operation of an operator, the electric power generating operation being interconnected with an electric power system, the method including the steps of: (a) executing a temperature increasing process of the hydrogen generating unit by the heater; (b) after the step (a), executing an electric power generation stand-by in which the fuel cell system stands by for the start of the electric power generating operation interconnected with the electric power system, while executing a temperature maintaining process of the hydrogen generating unit by the heater; and (c) when the command of the start of the electric power generating operation is received by the electric power generation start command unit, stopping the electric power generation stand-by and starting the electric power generating operation interconnected with the electric power system.

In accordance with this configuration, the wait time of the observer who confirms the set points of the system interconnection protective device before starting the system interconnection operation can be made shorter than that of the conventional fuel cell system.

The method for operating the fuel cell system according to a second aspect is configured such that in the step (b) of the method for operating the fuel cell system according to the first aspect, the combustor executes the temperature maintaining process by using the hydrogen-containing gas supplied from the hydrogen generating unit.

In accordance with this configuration, the electric power generation stand-by is executed while generating the hydrogen-containing gas by the hydrogen generating unit. Therefore, after the electric power generation start command unit receives the electric power generation start command, the electric power generating operation interconnected with the electric power system can be started immediately. On this account, the wait time of the observer who confirms the set points of the system interconnection protective device before starting the system interconnection operation can be further made shorter than that of a fuel cell system in which the hydrogen generating unit does not generate the hydrogen-containing gas during the electric power generation stand-by.

The method for operating the fuel cell system according to a third aspect is configured such that in the step (b) of the method for operating the fuel cell system according to the first aspect, the electric power generating operation of the fuel cell system stands by, and the hydrogen-containing gas from the hydrogen generating unit is not consumed by the electric power generating operation of the fuel cell system but is supplied to the combustor.

In accordance with this configuration, the wait time of the observer who confirms the set points of the system interconnection protective device before starting the system interconnection operation can be further made shorter than that of the fuel cell system in which the hydrogen generating unit does not generate the hydrogen-containing gas during the electric power generation stand-by.

In the method for operating the fuel cell system according to the fourth aspect, the fuel cell system further includes an internal electric power load, and in the step (b) of the method for operating the fuel cell system according to the first aspect, the electric power generating operation of the fuel cell system is started, and electric power generated by the electric power generating operation is supplied to the internal electric power load.

In accordance with this configuration, the electric power obtained by the electric power generation by the fuel cell during the electric power generation stand-by can be effectively utilized, and the energy efficiency of the fuel cell system becomes higher than that of the fuel cell system of the third aspect in which the electric power generation stand-by continues without utilizing the generated hydrogen-containing gas in the electric power generation.

Embodiment 1

Device Configuration

FIG. 1 is a block diagram showing one example of the schematic configuration of the fuel cell system of Embodiment 1 of the present invention.

A fuel cell system 100 of the present embodiment mainly includes: a hydrogen generating unit 16 configured to generate a hydrogen-containing fuel gas (a hydrogen-containing gas; a gas containing a $H_2$ gas) from a raw material and supply the hydrogen-containing fuel gas; an air supply device 20 configured to supply an oxidizing gas (air); a fuel cell 10 configured to generate electric power by an electrochemical reaction using the fuel gas supplied from the hydrogen generating unit 16 and the oxidizing gas supplied from the air supply device 20; a controller 28 configured to control operations of respective portions of the fuel cell system 100; a start-up command unit 30; and an electric power generation start command unit 32.

The hydrogen generating unit 16 supplies the fuel gas through a fuel gas supply passage 12 to the fuel cell 10. As the raw material supply unit, a booster pump 11 (booster) and a flow rate control valve 15 are disposed on a gas passage through which the raw material is supplied to the hydrogen generating unit 16. The booster pump 11 is connected to the controller 28 so as to be able to communicate with the controller 28. The booster pump 11 boosts the pressure of the raw material based on the control of the controller 28. The flow rate control valve 15 is connected to the controller 28 so as to be able to communicate with the controller 28. Based on the control of the controller 28, the flow rate control valve 15 adjusts the flow rate of the raw material whose pressure has been boosted by the booster pump 11. In the present embodiment, the booster pump 11 and the flow rate control valve 15 are provided as the raw material supply unit. However, the raw material supply unit may be constituted by one of the booster pump 11 and the flow rate control valve 15. A reformer (not shown) configured to generate the hydrogen-containing gas by using the raw material, a temperature detector 17 configured to detect the temperature of the hydrogen generating unit 16, and a heater 18 are attached to the hydrogen generating unit 16. Used as the heater 18 is a burner, an electric heater, or the like. The temperature detector 17 detects the temperature of the hydrogen generating unit 16 and transmits the detection result to the controller 28. The controller 28 controls the heater 18 based on the temperature received from the temperature detector 17. With this, the temperature of the hydrogen generating unit 16 is maintained at a temperature suitable for the generation of the fuel gas. The raw material may be an organic compound containing at least carbon and hydrogen as constituent elements. Examples of the raw material are hydrocarbons, such as a city gas, a propane gas, kerosene, and alcohols, such as methanol.

In the present example, the hydrogen generating unit 16 includes only the reformer. However, the hydrogen generating unit 16 may include a CO reducer configured to reduce carbon monoxide in the hydrogen-containing gas generated by the reformer. Provided as the CO reducer may be one or both of a shift converter configured to reduce the carbon monoxide by a shift reaction and a CO remover configured to reduce the carbon monoxide by an oxidation reaction or a methanation reaction. In this case, the heater 18 may directly heat only the reformer to heat the hydrogen generating unit 16 or may directly heat both the reformer and the CO reducer. In the former case, the CO reducer is indirectly heated by the heater 18 via the heated gas supplied from the reformer.

The air supply device 20 supplies the air through an oxidizing gas supply passage 14 to the fuel cell 10. In the present embodiment, the air is used as the oxidizing agent. However, the other oxidizing agent may be used. Mainly used as the air supply device 20 is a reciprocating pump, a turbo fan, a scroll fan, or the like.

The booster pump 11, the flow rate control valve 15, the hydrogen generating unit 16, the heater 18, and the temperature detector 17 constitute a hydrogen generator.

The fuel gas and oxidizing gas supplied to the fuel cell 10 are used for an electric power generating reaction and then respectively discharged as a fuel exhaust gas and an oxidizing agent exhaust gas through a fuel gas discharge passage 22 and an oxidizing gas discharge passage 24 to the outside of the fuel cell system 100. Mainly used as the fuel cell 10 is a polymer electrolyte fuel cell, a phosphoric-acid fuel cell, a solid-oxide fuel cell, or the like.

If the fuel cell 10 is the solid-oxide fuel cell, it may be an external reforming type solid-oxide fuel cell or an internal reforming type solid-oxide fuel cell. In the case of the external reforming type solid-oxide fuel cell, the hydrogen generating unit including the reformer and a fuel cell main body are separately formed as shown in FIG. 1. In the case of the internal reforming type solid-oxide fuel cell, the hydrogen generating unit and the fuel cell main body are integrally formed.

The electric power generated by the electric power generation of the fuel cell 10 is converted from the DC power to the AC power by an electric power converter 26 including a DC/AC converting unit 26A (inverter), and the voltage of the AC power is also adjusted by the electric power converter 26. Such electric power is supplied to electric power loads (external loads), such as electric light and various electric devices. The electric power loads are connected to the output electric power of the fuel cell system 100 and the electric power system (thermal power plant or the like). According to need, the electric power of one or both of the fuel cell system 100 and the electric power system is supplied to the load.

In a case where an abnormality occurs in the electric power system or the electric power converter 26, and an abnormality of an AC voltage or AC frequency output from the electric power converter 26 occurs, a system interconnection protective device 35 cuts off (performs parallel off of) an electric path between the electric power converter 26 and an interconnection point 36 by a parallel off unit 37, performs gate block of the DC/AC converting unit 26A, and stops the system interconnection operation. Here, thresholds (hereinafter referred to as "set points") are set in the system interconnection protective device 35. This thresholds are used to determine whether or not the abnormality of the AC output or AC frequency output from the electric power converter 26 has occurred. Examples of the set points are a set point regarding AC overvoltage detection (OVR), a set point regarding AC undervoltage detection (UVR), a set point regarding AC frequency increase detection (OFR), and a set point regarding AC frequency decrease detection (UFR). Specific examples of the respective set points are as follows. That is, the set point regarding the AC overvoltage detection is 110V with respect to a target of 100V, the set point regarding the AC undervoltage detection (UVR) is 90V with respect to a target of 100V, the set point regarding the AC frequency increase detection (OFR) is 51.0 Hz with respect to a target of 50.0 Hz, and the set point regarding the AC frequency decrease detection (UFR) is 49.0 Hz with respect to a target of 50.0 Hz. These numerical values are just examples and are set suitably depending on the specs of the electric power system and the fuel cell.

The controller 28 includes a CPU 29 and a memory 27. The controller 28 is connected to the hydrogen generating unit 16, the air supply device 20, the fuel cell 10, and the electric power converter 26 so as to be able to communicate with these components. The controller 28 operates such that the CPU 29 executes programs stored in the memory 27. The controller 28 controls the temperatures of the hydrogen generating unit 16 and the fuel cell 10, the amount of hydrogen-containing gas supplied, the amount of air supplied, the amount of electric power generated by the fuel cell 10, and the like.

Each of the start-up command unit 30 and the electric power generation start command unit 32 includes, for example, a button. An operator presses these buttons to command the fuel cell system 100 to start the operation and the electric power generation. Each of the start-up command unit 30 and the electric power generation start command unit 32 may be a remote controller.

Operations

Figure 2:
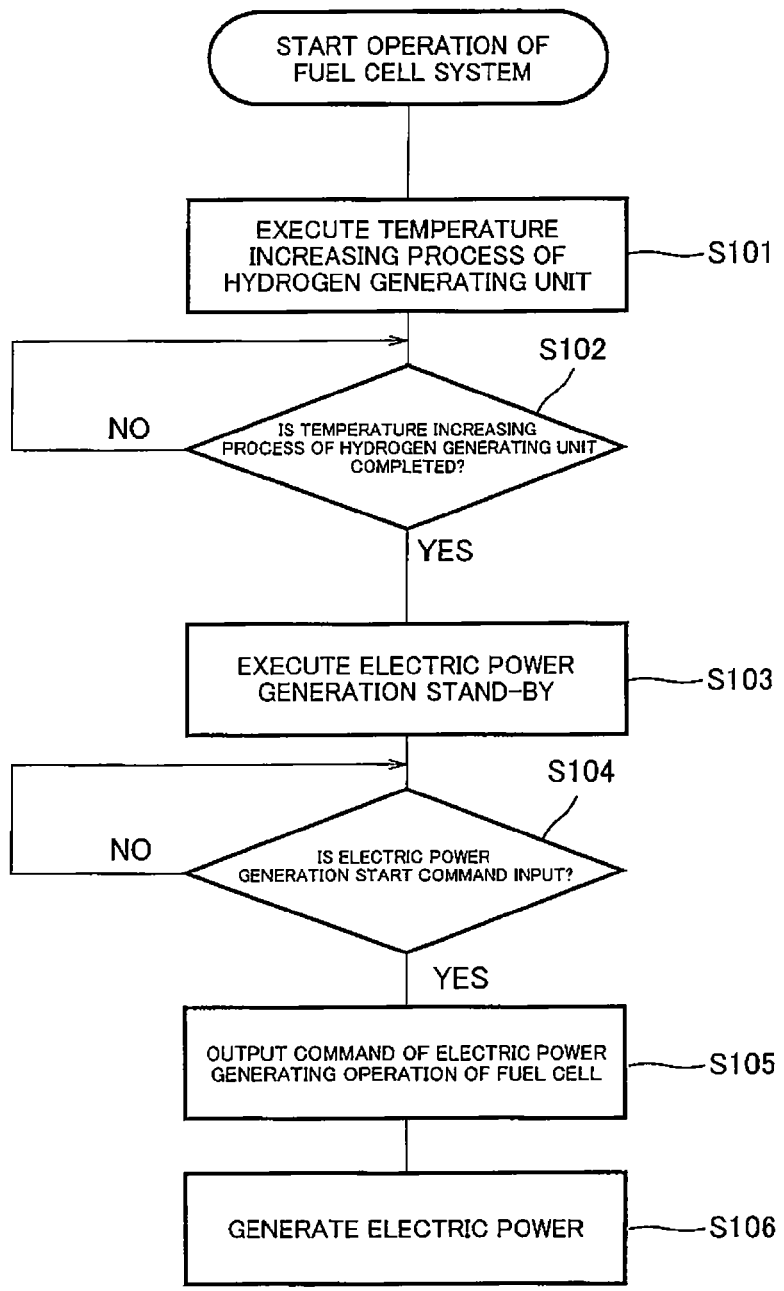
FIG. 2 is a flow chart schematically showing one example of a start-up process of the fuel cell system of Embodiment 1 of the present invention.

FIG. 2 is a flow chart schematically showing one example of a start-up process (program executed by the controller 28 when the fuel cell system 100 starts up) of the fuel cell system 100 of Embodiment 1 of the present invention.

When a start-up command is input to the start-up command unit 30 by the operator, the controller 28 starts the operation of the fuel cell system 100. With this, the temperature increasing process of the hydrogen generating unit is started (Step S101).

In the temperature increasing process of the hydrogen generating unit, the controller 28 controls the heater 18 such that the temperature of the hydrogen generating unit 16 increases up to a predetermined temperature (For example, the temperature of the reformer of the hydrogen generating unit is about 650° C.) at which the hydrogen-containing gas can be supplied to the fuel cell during the electric power generating operation of the fuel cell system. When the temperature of the hydrogen generating unit 16 reaches the predetermined temperature (when the temperature increase is completed), the controller 28 completes the step of the temperature increasing process of the hydrogen generating unit (Step S102), and the process shifts to electric power generation stand-by (electric power generation stand-by step) (Step S103).

During the electric power generation stand-by, the controller 28 controls the heater 18 to execute a temperature maintaining process of maintaining the temperature of the hydrogen generating unit 16 within a predetermined temperature range (For example, the temperature of the reformer of the hydrogen generating unit 16 is about 630 to 670° C.). It is preferable that the lower limit of the above temperature range be a temperature equal to or higher than a lower temperature limit (for example, 630° C.) at which the hydrogen-containing gas can be supplied to the fuel cell during the electric power generating operation, and it is preferable that the upper limit of the above temperature range be a temperature equal to or lower than a heatproof temperature of the hydrogen generating unit 16.

The lower temperature limit at which the hydrogen-containing gas can be supplied to the fuel cell during the electric power generating operation is, in other words, a lower temperature limit of the hydrogen generating unit, the lower temperature limit being the lower limit of the temperature necessary to continue the electric power generating operation of the fuel cell. For example, if the lower temperature limit at which the hydrogen-containing gas can be supplied to the fuel cell during the electric power generating operation is the temperature of the reformer, it is defined as a lower temperature limit for maintaining hydrogen generation efficiency (methane conversion ratio) of the hydrogen generating unit 16 within an appropriate range. Moreover, if the lower temperature limit at which the hydrogen-containing gas can be supplied to the fuel cell during the electric power generating operation is the temperature of the CO reducer (shift converter or CO remover), it is defined as a lower temperature limit at which the carbon monoxide concentration of the hydrogen-containing gas can be reduced to a level that the hydrogen-containing gas can be supplied to the fuel cell.

The heatproof temperature of the hydrogen generating unit 16 is each of heatproof temperatures of components of the hydrogen generating unit 16. Examples are the heatproof temperature of a reforming catalyst filled in the reformer, the heatproof temperature of a shift catalyst filled in the shift converter (not shown), and the heatproof temperature of a oxidation catalyst or methanation catalyst filled in the CO remover. Moreover, in the above temperature maintaining process, the heating operation of the heater 18 may be performed continuously or intermittently.

During the electric power generation stand-by, the controller 28 controls the booster pump 11 and the flow rate control valve 15 to start supplying the raw material to the hydrogen generating unit 16 and starts supplying the water from a water supply unit, not shown, and the hydrogen generating unit 16 generates a fuel gas (hydrogen-containing gas) containing hydrogen ($H_2$ gas) by the reforming reaction and starts supplying the fuel gas to the fuel cell 10. The fuel gas discharged from the fuel cell 10 is combusted or diluted by a fuel gas processor 25 to be discharged to the atmosphere.

While the controller 28 is executing the electric power generation stand-by, it determines whether or not the electric power generation start command is input to the electric power generation start command unit 32 by the operator (Step S104). When the determination result is NO, the electric power generation stand-by (Step S103) continues. When the observer of the electric power company confirms that the above set points are proper, and the operator inputs the electric power generation start command to the electric power generation start command unit 32, the determination result becomes YES, and the start of the electric power generating operation of the fuel cell 10 is commanded (Step S105). Then, the supply of the oxidizing gas from the air supply device 20 to the fuel cell 10 is started, and an electric power generating step is started (Step S106). Specifically, the parallel off unit 37 is turned on, and the electric power is obtained from the electric power converter 26 and supplied to, for example, home electric power loads (external loads) interconnected with the electric power system (commercial system).

A known process may be used as an operation termination process (stop step) of the fuel cell system 100, so that an explanation thereof is omitted.

Moreover, in the temperature increasing process and the temperature maintaining process, the temperature of the hydrogen generating unit 16 is controlled to become a temperature at which the hydrogen generating unit 16 generates the hydrogen-containing gas which can be supplied to the fuel cell during the electric power generating operation. However, the temperature of the hydrogen generating unit 16 may be controlled to become a temperature which is equal to or higher than a lower temperature limit (for example, 300° C. or higher) at which the hydrogen generating unit 16 can generate the hydrogen-containing gas or a temperature which is lower than this lower temperature limit but can be increased up to the lower temperature limit or higher immediately (for example, within several minutes). Even in this case, in the temperature maintaining process, the heating operation of the heater 18 may be performed continuously or intermittently.

Moreover, the temperature of the hydrogen generating unit 16 may be controlled such that: in the temperature increasing process, the temperature of the hydrogen generating unit 16 is increased up to a predetermined temperature (For example, the temperature of the reformer of the hydrogen generating unit is about 650° C.) at which the hydrogen-containing gas can be supplied to the fuel cell during the electric power generating operation; and in the temperature maintaining process, the temperature of the hydrogen generating unit 16 becomes equal to or higher than a predetermined temperature which is lower than the lower temperature limit at which the hydrogen-containing gas can be supplied to the fuel cell during the electric power generating operation. Specifically, after the execution of the temperature increasing process, the heating operation by the heater 18 stops, and the hydrogen generating unit 16 is naturally cooled. Each time the temperature of the hydrogen generating unit 16 becomes equal to or lower than the predetermined temperature that is lower than the lower temperature limit at which the hydrogen-containing gas can be supplied to the fuel cell during the electric power generating operation, the heating operation by the heater 18 is restarted, and the temperature maintaining process is repeatedly executed. For example, it is preferable that the predetermined temperature be a temperature equal to or higher than the lower temperature limit (for example, 300° C.) at which the hydrogen generating unit 16 can generate the hydrogen-containing gas.

Moreover, in the above fuel cell system, the heater 18 and the fuel gas processor 25 are individually provided. However, the fuel gas processor 25 may be a burner and also serve as the heater 18. In this case, during the electric power generation stand-by, the temperature maintaining process of the hydrogen generating unit 16 is executed by combusting the hydrogen-containing gas, discharged from the fuel cell 10, in the fuel gas processor 25. In addition, in the temperature increasing process, the combustible gas (the raw material at a temperature at which the hydrogen generating unit 16 cannot generate the hydrogen-containing gas; the hydrogen-containing gas at a temperature at which the hydrogen generating unit 16 can generate the hydrogen-containing gas) having flowed through the hydrogen generating unit 16 and the fuel cell is combusted in the fuel gas processor to heat the hydrogen generating unit 16.

In accordance with the fuel cell system of the present embodiment, in the start-up process, until the electric power generation start is commanded even after the completion of the temperature increasing process of the hydrogen generating unit 16, the electric power generation stand-by is performed while executing the temperature maintaining process of the hydrogen generating unit 16. As above, the start-up process is started in advance, and the temperature of the hydrogen generating unit is increased and maintained. With this, the observer, such as the employee of the electric power company, can start the electric power generation immediately after the arrival. Therefore, in a case where the observer confirms the set points of the system interconnection protective device before starting the system interconnection operation, the wait time of the observer can be made shorter than that of the conventional fuel cell system.

In the present embodiment, the electric power generation stand-by is performed with the hydrogen-containing gas continuously supplied to the fuel cell. Therefore, when the electric power generation start command is received, the electric power generating operation interconnected with the electric power system can be started immediately, which is preferable.

Modification Example 1

In the fuel cell system of Embodiment 1, during the electric power generation stand-by, the hydrogen-containing gas is supplied from the hydrogen generating unit to the fuel cell. The fuel cell system of Modification Example 1 is different from the fuel cell system of Embodiment 1 in that during the electric power generation stand-by, the generation of the hydrogen-containing gas by the hydrogen generating unit stands by, that is, the supply of the hydrogen-containing gas from the hydrogen generating unit to the fuel cell stands by.

The device configuration of the fuel cell system of the present modification example may be the same as that of the fuel cell system 100 of Embodiment 1. Therefore, the same reference signs and names are used for the same components, and detailed explanations thereof are omitted.

The operations of the fuel cell system of the present modification example are substantially the same as the operations (FIG. 2) of the fuel cell system of Embodiment 1 described above. Hereinafter, the operations of the fuel cell system of the present modification example will be explained.

Steps of starting the operation of the fuel cell system and executing the temperature increasing process of the hydrogen generating unit are the same as Steps S101 and S102 described above.

After the completion of the temperature increasing process of the hydrogen generating unit, the electric power generation stand-by is executed. This step corresponds to Step S103 described above.

During the electric power generation stand-by of the present modification example, the controller 28 controls the heater 18 to execute the temperature maintaining process of maintaining the temperature of the hydrogen generating unit 16 within a predetermined temperature range (For example, the temperature of the reformer of the hydrogen generating unit 16 is about 630 to 670° C.). It is preferable that the lower limit of the above temperature range be a temperature equal to or higher than the lower temperature limit (for example, 630° C.) at which the hydrogen-containing gas can be supplied to the fuel cell during the electric power generating operation, and it is preferable that the upper limit of the above temperature range be a temperature equal to or lower than the heatproof temperature of the hydrogen generating unit 16. The heatproof temperature of the hydrogen generating unit 16 is a heatproof temperature of a component of the hydrogen generating unit 16. Examples are the heatproof temperature of the reforming catalyst filled in the reformer, the heatproof temperature of the shift catalyst filled in the shift converter (not shown), and the heatproof temperature of the oxidation catalyst or methanation catalyst filled in the CO remover. Moreover, in the temperature maintaining process, the heating operation of the heater 18 may be performed continuously or intermittently.

During the electric power generation stand-by of the present modification example, the controller 28 do not execute the generation of the hydrogen-containing gas by the hydrogen generating unit 16. In the present embodiment, during the electric power generation stand-by, the supply of the raw material and the supply of the water are blocked by, for example, shut-off valves, not shown, and the gas is not discharged from the hydrogen generating unit.

A step of waiting the electric power generation start command while performing the electric power generation stand-by may be the same as Step S104 described above. When the observer of the electric power company confirms that the set points are proper, and the operator inputs the electric power generation start command to the electric power generation start command unit 32, the determination result becomes YES, and the supply of the raw material and water to the hydrogen generating unit 16 is started. With this, the supply of the hydrogen-containing gas from the hydrogen generating unit 16 to the fuel cell 10 is started (Step S105). Further, the supply of the oxidizing gas from the air supply device 20 to the fuel cell 10 is started, and the electric power generating step is started (Step S106). Specifically, the parallel off unit 37 is turned on, the electric power is obtained from the electric power converter 26 and supplied to, for example, home electric power loads (external loads) interconnected with the electric power system (commercial system).

In the above case, the hydrogen generating unit 16 includes only the reformer. However, in a case where the hydrogen generating unit 16 includes the reformer and the CO reducer, and the CO reducer is not directly heated by the heater 18 but is indirectly heated by the gas having passed through the reformer, the temperature increasing process and the temperature maintaining process are performed such that the temperature of only the reformer is increased and maintained by the heater 18.

To be specific, if the hydrogen generating unit 16 includes the reformer and the CO reducer, the temperature increasing process and the temperature maintaining process may be executed for at least the reformer, and whether to execute these processes for the CO reducer is optional.

Moreover, in the temperature increasing process and the temperature maintaining process, the temperature of the hydrogen generating unit 16 is controlled to become a temperature at which the hydrogen generating unit 16 generates the hydrogen-containing gas which can be supplied to the fuel cell during the electric power generating operation. However, the temperature of the hydrogen generating unit 16 may be controlled to become a temperature which is equal to or higher than a lower temperature limit (for example, 300° C. or higher) at which the hydrogen generating unit 16 can generate the hydrogen-containing gas or a temperature which is lower than this lower temperature limit but can be increased up to the lower temperature limit or higher immediately (for example, within several minutes).

In accordance with the fuel cell system of the present modification example, in the start-up process, until the electric power generation start is commanded even after the completion of the temperature increasing process, the electric power generation stand-by is performed while executing the temperature maintaining process of the hydrogen generating unit 16. As above, the temperature increasing process is started in advance, and the temperature of the hydrogen generating unit is increased and maintained. With this, the electric power generation can be started immediately after the arrival of the observer, such as the employee of the electric power company. Therefore, in a case where the observer confirms the set points of the system interconnection protective device before starting the system interconnection operation, the wait time of the observer can be made shorter than that of the conventional fuel cell system.

During the electric power generation stand-by, the generation of the hydrogen-containing gas by the hydrogen generating unit stands by, and this leads to the reduction in the energy consumption.

Modification Example 2

In the fuel cell system of Embodiment 1, during the electric power generation stand-by, the supply of the hydrogen-containing gas from the hydrogen generating unit to the fuel cell and the temperature maintaining process are performed. In contrast, the fuel cell system of Modification Example 2 is characterized in that during the electric power generation stand-by, the supply of the hydrogen-containing gas from the hydrogen generating unit to the fuel cell stands by, and the temperature maintaining process is not performed.

The device configuration of the fuel cell system of the present modification example may be the same as that of the fuel cell system 100 of Embodiment 1. Therefore, the same reference signs and names are used for the same components, and detailed explanations thereof are omitted.

The operations of the fuel cell system of the present modification example are substantially the same as the operations (FIG. 2) of the fuel cell system of Embodiment 1 described above. Hereinafter, the operations of the fuel cell system of the present modification example will be explained.

Steps of starting the operation of the fuel cell system and executing the temperature increasing process of the hydrogen generating unit 16 are the same as Steps S101 and S102 described above.

When the temperature increasing process of the hydrogen generating unit is completed, the electric power generation stand-by is performed. This step corresponds to Step S103 described above.

Unlike the fuel cell systems of Embodiment 1 and Modification Example 1, during the electric power generation stand-by of the present modification example, the controller 28 do not execute the generation of the hydrogen-containing gas by the hydrogen generating unit 16, stops the heating operation by the heater 1, and do not execute the temperature maintaining process. Therefore, the hydrogen generating unit 16 gradually decreases in temperature (is naturally cooled) by the influence of the ambient temperature.

A step of waiting the electric power generation start command while performing the electric power generation stand-by is the same as Step S104 described above. When the observer of the electric power company confirms that the set points are proper, and the operator inputs the electric power generation start command to the electric power generation start command unit 32, the determination result becomes YES, the temperature of the hydrogen generating unit 16 is increased by the heater 16 up to a temperature equal to or higher than the predetermined temperature at which the hydrogen generating unit 16 generates the hydrogen-containing gas which can be supplied to the fuel cell during the electric power generating operation, and the hydrogen-containing gas is supplied from the hydrogen generating unit 16 to the fuel cell (Step S105). Then, the supply of the oxidizing gas from the air supply device 20 to the fuel cell 10 is started, and the electric power generating step is started (Step S106). Specifically, the parallel off unit 37 is turned on, and the electric power is obtained from the electric power converter 26 and supplied to, for example, home electric power loads (external loads) interconnected with the electric power system (commercial system). The generation of the hydrogen-containing gas in Step S105 may be started at a time point when the temperature detector 17 detects that the temperature of the hydrogen generating unit 16 is equal to or higher than the temperature at which the hydrogen-containing gas can be generated or a time point when the temperature detector 17 detects that the temperature of the hydrogen generating unit 16 is equal to or higher than the temperature at which the hydrogen generating unit 16 generates the hydrogen-containing gas which can be supplied to the fuel cell during the electric power generating operation.

In accordance with the fuel cell system of the present modification example, since the temperature increasing process is executed in advance before the arrival of the employee of the electric power company, the hydrogen generating unit has remaining heat at a time point when the observer, such as the employee of the electric power company, arrives and inputs the electric power generation start command. Therefore, the electric power generation can be started more quickly than that of the conventional fuel cell system. Therefore, in a case where the observer confirms the set points of the system interconnection protective device before the start of the system interconnection operation, the wait time of the observer can be made shorter than that of the conventional fuel cell system.

Moreover, during the electric power generation stand-by, the generation of the hydrogen-containing gas by the hydrogen generating unit stands by, and the temperature maintaining process is not executed. This leads to the reduction in the energy consumption during the electric power generation stand-by.

Embodiment 2

Device Configuration

Figure 3:
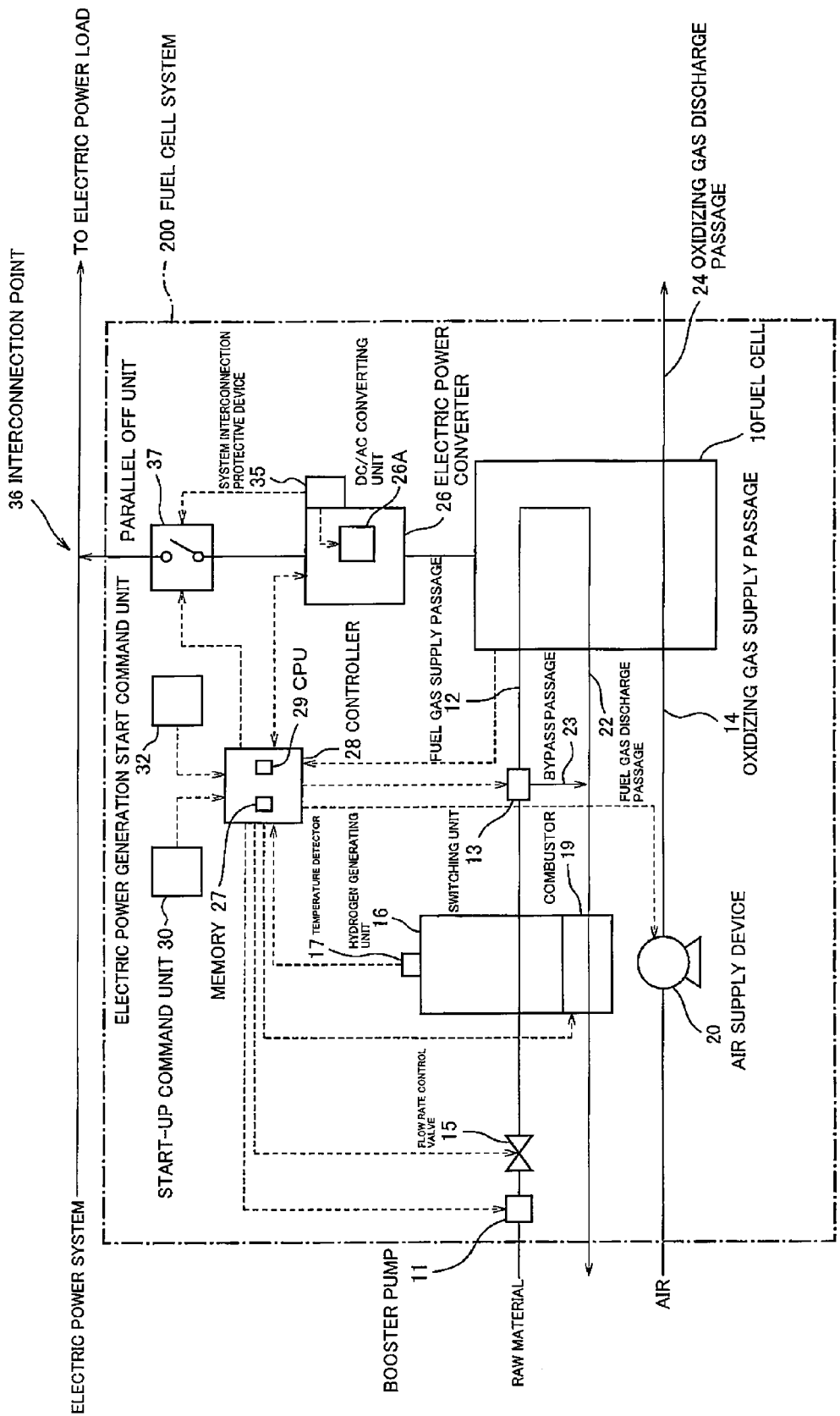
FIG. 3 is a block diagram showing one example of the schematic configuration of the fuel cell system of Embodiment 2 of the present invention.

FIG. 3 is a block diagram showing one example of the schematic configuration of the fuel cell system of Embodiment 2 of the present invention.

A fuel cell system 200 of the present embodiment is configured such that in the fuel cell system 100 of Embodiment 1, the heater 18 and the fuel gas processor 25 (combustor) are configured as one component. Specifically, the fuel cell system 200 of the present embodiment is configured such that: the heater 18 and the fuel gas processor 25 are not provided; a combustor 19 is newly provided; and the gas having passed through a bypass passage 23 is supplied to the combustor 19. Other than these, the fuel cell system 200 of the present embodiment is the same as the fuel cell system 100. Therefore, the same reference signs are used for the same components as in the fuel cell system 100, and explanations thereof are omitted.

The bypass passage 23 causes the fuel gas supply passage 12 and the fuel gas discharge passage 22 to communicate with each other via a switching unit 13.

The switching unit 13 is connected to the controller 28 so as to be able to communicate with the controller 28. Based on the control of the controller 28, the switching unit 13 switches a destination to which the gas discharged from the hydrogen generating unit 16 is supplied, between the fuel cell 10 and the fuel gas discharge passage 22 (combustor 19).

When the destination is switched to the fuel gas discharge passage 22 (combustor 19), the gas discharged from the hydrogen generating unit 16 is not supplied to the fuel cell 10 but is supplied through the bypass passage 23 and the fuel gas discharge passage 22 to the combustor 19. The gas (unreacted raw material at the beginning of the start-up process; hydrogen-containing gas when the temperature of the hydrogen generating unit has reached the temperature at which the hydrogen-containing gas can be generated) discharged from the hydrogen generating unit 16 is combusted in the combustor 19.

When the destination is switched to the fuel cell 10, the gas discharged from the hydrogen generating unit 16 is not supplied to the bypass passage 23 but is supplied to the fuel cell 10. As the switching unit 13, a three-way valve, two solenoid valves, or the like is used. In the case of using two solenoid valves, these solenoid valves are respectively disposed on the fuel gas supply passage 12 (disposed on a downstream side; disposed between the fuel cell 10 and a connection point where the fuel gas supply passage 12 and the bypass passage 23 are connected to each other) and the bypass passage 23. These solenoid valves are operated such that when one of these is closed, the other opens. In this case, the gas (fuel exhaust gas) discharged from the fuel cell 10 is combusted in the combustor 19.

The fuel gas discharge passage 22 causes the fuel cell 10, the bypass passage 23, and the combustor 19 to communicate with one another, and the gas discharged from the hydrogen generating unit 16 or the fuel cell 10 is supplied through the fuel gas discharge passage 22 to the combustor 19.

The combustor 19 combusts the raw material, the gas discharged from the hydrogen generating unit 16, the gas discharged from the fuel cell 10, or a mixture gas thereof to heat the hydrogen generating unit 16. The combustor 19 corresponds to the heater 18 of Embodiment 1. The combustor 19 is connected to the controller 28 so as to be able to communicate with the controller 28. Based on the control of the controller 28, the combustor 19 heats the hydrogen generating unit 16. Moreover, in the present embodiment, the raw material supply unit is configured to serve as a combustion gas supply unit of the present invention. To be specific, the controller 28 controls the booster pump 11 and the flow rate control valve 15 to adjust the amount of raw material supplied through the bypass passage 23 to the combustor 19. With this, how much the hydrogen generating unit 16 is heated is controlled.

A bypass passage (not shown) bypassing the hydrogen generating unit 16 may be formed instead of the bypass passage 23 bypassing the fuel cell 10, and the raw material may be directly supplied as the fuel gas through this bypass passage to the combustor 19.

In the fuel gas supply passage 12, a passage connecting the hydrogen generating unit 16 and the switching unit 13 is called a first fuel gas supply passage, and a passage connecting the switching unit 13 and the fuel cell 10 is called a second fuel gas supply passage. A point where the fuel gas discharge passage 22 and the bypass passage 23 meet is called a meeting point. In the fuel gas discharge passage 22, a passage connecting the fuel cell 10 and the meeting point is called a first fuel gas discharge passage, and a passage connecting the meeting point and the combustor 19 is called a second fuel gas discharge passage. The first fuel gas supply passage, the bypass passage 23, and the second fuel gas discharge passage constitute a short passage. Through the short passage, the gas discharged from the hydrogen generating unit 16 is directly supplied to the combustor 19 without flowing through the fuel cell 10.

Operations

The operations of the fuel cell system 200 are substantially the same as the operations (FIG. 2) of the fuel cell system 100.

The operations of the fuel cell system 200 are different from those of the fuel cell system 100 in that in the temperature increasing process of the hydrogen generating unit (Step S101) and the start of the electric power generation stand-by of the fuel cell system (Step S103), the destination to which the gas discharged from the hydrogen generating unit flows is controlled by the controller 28 and the switching unit 13.

To be specific, in the temperature increasing process of the hydrogen generating unit (Step S101), the raw material is supplied to the hydrogen generating unit 16, and the switching unit 13 is switched (the switching unit 13 is switched to the bypass passage 23) such that the gas discharged from the hydrogen generating unit 16 is supplied through the bypass passage 23 and the fuel gas discharge passage 22 to the combustor 19. In the above temperature increasing process, when the temperature of the hydrogen generating unit 16 becomes equal to or higher than the lower temperature limit at which the hydrogen generating unit 16 can generate the hydrogen-containing gas, the water is supplied from the water supply unit (not shown), and the generation of the hydrogen-containing gas is started.

During the electric power generation stand-by (Step S103), the switching unit 13 is switched (the switching unit 13 is switched to the fuel cell 10) such that the hydrogen-containing gas discharged from the hydrogen generating unit 16 is supplied through the fuel gas supply passage 12 to the fuel cell 10. With this, the hydrogen-containing gas discharged from the hydrogen generating unit 16 is continuously supplied through the fuel cell 10 and the fuel gas discharge passage 22 to the combustor 19. Thus, during the electric power generation stand-by, the combustor 19 combusts the hydrogen-containing gas, supplied from the hydrogen generating unit 16, to execute the temperature maintaining process of the hydrogen generating unit 16. In addition, during the electric power generation stand-by, the fuel cell does not perform the electric power generating operation. Therefore, the hydrogen-containing gas generated by the hydrogen generating unit is not consumed by the electric power generation of the fuel cell but is supplied to the combustor. In a case where the temperature detector 17 is a temperature detector configured to detect the temperature of the reformer, during the electric power generation stand-by in the temperature maintaining process, the controller 28 may control the amount of raw material supplied by the raw material supply unit to the hydrogen generating unit 16 such that the temperature detected by the temperature detector 17 becomes equal to or higher than the lower temperature limit (for example, 630° C.) at which the hydrogen-containing gas can be supplied to the fuel cell during the electric power generating operation. Moreover, it is preferable that the amount of raw material supplied to the hydrogen generating unit 16 be controlled by the raw material supply unit such that the temperature detected by the temperature detector 17 becomes equal to or lower than an upper temperature limit (for example, 670° C.) equal to or lower than the heatproof temperature of the hydrogen generating unit 16.

Then, while performing the electric power generation stand-by, the controller 28 determines whether or not the electric power generation start command is input to the electric power generation start command unit 32 by the operator (Step S104). When the observer of the electric power company confirms that the set points of the system interconnection protective device 35 are proper, and the operator inputs the electric power generation start command to the electric power generation start command unit 32, the determination result becomes YES, and the start of the electric power generating operation of the fuel cell 10 is commanded (Step S105).

When the start of the electric power generation of the fuel cell is commanded, the supply of the air as the oxidizing gas from the air supply device 20 to the fuel cell 10 is started, and the electric power generating step is started (Step S106). To be specific, the electric power of the fuel cell 10 is obtained from the electric power converter 26 and supplied to, for example, home electric power loads (external loads) interconnected with the electric power system.

The fuel cell system of the present embodiment includes: the bypass passage 23 configured to bypass the fuel cell 10 and be connected to the fuel gas discharge passage 22; and the switching unit 13 configured to switch the destination to which the gas discharged from the hydrogen generating unit 16 flows, between the fuel cell 10 and the bypass passage 23. However, in a case where the fuel cell 10 is a fuel cell, such as a solid-oxide fuel cell, which is less likely to deteriorate by the carbon monoxide contained in the fuel gas, the fuel cell system may be configured such that: the bypass passage 23 and the switching unit 13 are not provided; and the gas discharged from the hydrogen generating unit 16 is supplied to the fuel cell 10.

Moreover, in the temperature increasing process and the temperature maintaining process, the temperature of the hydrogen generating unit 16 is controlled to become a temperature at which the hydrogen generating unit 16 generates the hydrogen-containing gas which can be supplied to the fuel cell during the electric power generating operation. However, the temperature of the hydrogen generating unit 16 may be controlled to become a temperature which is equal to or higher than a lower temperature limit (for example, 300° C. or higher) at which the hydrogen generating unit 16 can generate the hydrogen-containing gas or a temperature which is lower than this lower temperature limit but can be increased up to the lower temperature limit or higher immediately (for example, within several minutes).

The present embodiment can also obtain the same effects as Embodiment 1.

Further, in the present embodiment, the gas heated by the combustor 19 flows through the inside of the hydrogen generating unit in the temperature increasing process of the hydrogen generating unit and the electric power generation stand-by. Therefore, the heat conduction inside the hydrogen generating unit is accelerated by the gas, and the temperature increase and temperature maintenance of the hydrogen generating unit can be easily realized.

Modification Example 1

In the fuel cell system of Embodiment 2, during the electric power generation stand-by, the hydrogen-containing gas is supplied from the hydrogen generating unit to the fuel cell. The fuel cell system of the present modification example is different from the fuel cell system of Embodiment 2 in that during the electric power generation stand-by, the supply of the hydrogen-containing gas from the hydrogen generating unit to the fuel cell stands by.

The device configuration of the fuel cell system of the present modification example is the same as that of the fuel cell system 200 of Embodiment 2. Therefore, the same reference signs and names are used for the same components, and detailed explanations thereof are omitted.

To be specific, in the temperature increasing process of the hydrogen generating unit (Step S101), the raw material is supplied to the hydrogen generating unit 16, and the switching unit 13 is switched (the switching unit 13 is switched to the bypass passage 23) such that the gas discharged from the hydrogen generating unit 16 is supplied through the bypass passage 23 and the fuel gas discharge passage 22 to the combustor 19. In the above temperature increasing process, when the temperature of the hydrogen generating unit 16 becomes equal to or higher than the lower temperature limit at which the hydrogen generating unit 16 can generate the hydrogen-containing gas, the water is supplied from the water supply unit (not shown), and the generation of the hydrogen-containing gas is started.

During the electric power generation stand-by (Step S103), the raw material and the water are supplied to the hydrogen generating unit 16, and the switching of the switching unit 13 is not performed. With this, the hydrogen-containing gas discharged from the hydrogen generating unit 16 is continuously supplied through the bypass passage 23 and the fuel gas discharge passage 22 to the combustor 19. Thus, during the electric power generation stand-by, the combustor 19 combusts the hydrogen-containing gas, supplied from the hydrogen generating unit 16, to execute the temperature maintaining process of the hydrogen generating unit 16. In addition, during the electric power generation stand-by, the hydrogen-containing gas generated by the hydrogen generating unit 16 is not consumed by the electric power generation of the fuel cell but is supplied to the combustor 19.

In a case where the temperature detector 17 is a temperature detector configured to detect the temperature of the reformer, during the electric power generation stand-by, the controller 28 may control the amount of raw material supplied by the raw material supply unit to the hydrogen generating unit 16 such that the temperature detected by the temperature detector 17 becomes equal to or higher than the lower temperature limit (for example, 630° C.) at which the hydrogen-containing gas can be supplied to the fuel cell during the electric power generating operation. Moreover, it is preferable that the amount of raw material supplied to the hydrogen generating unit 16 be controlled by the raw material supply unit such that the temperature detected by the temperature detector 17 becomes equal to or lower than an upper limit (for example, 670° C.) equal to or lower than the heatproof temperature of the hydrogen generating unit 16.

Moreover, in the temperature increasing process and the temperature maintaining process, the temperature of the hydrogen generating unit 16 is controlled to become a temperature at which the hydrogen generating unit 16 generates the hydrogen-containing gas which can be supplied to the fuel cell during the electric power generating operation. However, the temperature of the hydrogen generating unit 16 may be controlled to become a temperature which is equal to or higher than a lower temperature limit (for example, 300° C. or higher) at which the hydrogen generating unit 16 can generate the hydrogen-containing gas or a temperature which is lower than this lower temperature limit but can be increased up to the lower temperature limit or higher immediately (for example, within several minutes).

When the supply of the hydrogen-containing gas to the fuel cell is started (Step S105), the switching unit 13 is switched (the switching unit 13 is switched to the fuel cell 10) such that the hydrogen-containing gas discharged from the hydrogen generating unit 16 is supplied to the fuel cell 10. With this, the fuel gas is supplied to the fuel cell 10 (Step S105), and the supply of the oxidizing gas from the air supply device 20 to the fuel cell 10 is started. Thus, the electric power generating step is started (Step S106). Specifically, the electric power is obtained from the electric power converter 26 and supplied to, for example, home electric power loads (external loads) interconnected with the electric power system (commercial system).

The fuel cell system of the present modification example can also obtain the same effects as that of Embodiment 2.

Modification Example 2

The fuel cell system of the present modification example is characterized in that during the electric power generation stand-by of the fuel cell system of Embodiment 2 or Modification Example 1 of Embodiment 2, a control example of suppressing excess heating of the hydrogen generating unit 16 is executed.

In the present modification example, during the electric power generation stand-by, the controller 28 controls the temperature of the hydrogen generating unit 16 such that the temperature detected by the temperature detector 17 becomes equal to or lower than the upper temperature limit equal to or lower than the heatproof temperature of the hydrogen generating unit 16. Specific examples of this control method are: adjusting the amount of hydrogen-containing gas supplied to the combustor 19 by adjusting the amount of raw material supplied from the raw material supply unit to the hydrogen generating unit 16; adjusting the amount of combustion air supplied by a combustion air supply unit (not shown) to the combustor 19; and adjusting the amount of water to the reformer when the reformer generates the hydrogen-containing gas by using the raw material and the water.

During the electric power generation stand-by, the hydrogen-containing gas generated by the hydrogen generating unit 16 is not consumed by the electric power generation but is directly supplied to the combustor 19, so that the reformer tends to be excessively heated. In the present modification example, since the temperature of the hydrogen generating unit is controlled during the electric power generation stand-by, the hydrogen generating unit is prevented from being excessively heated.

Figure 4:
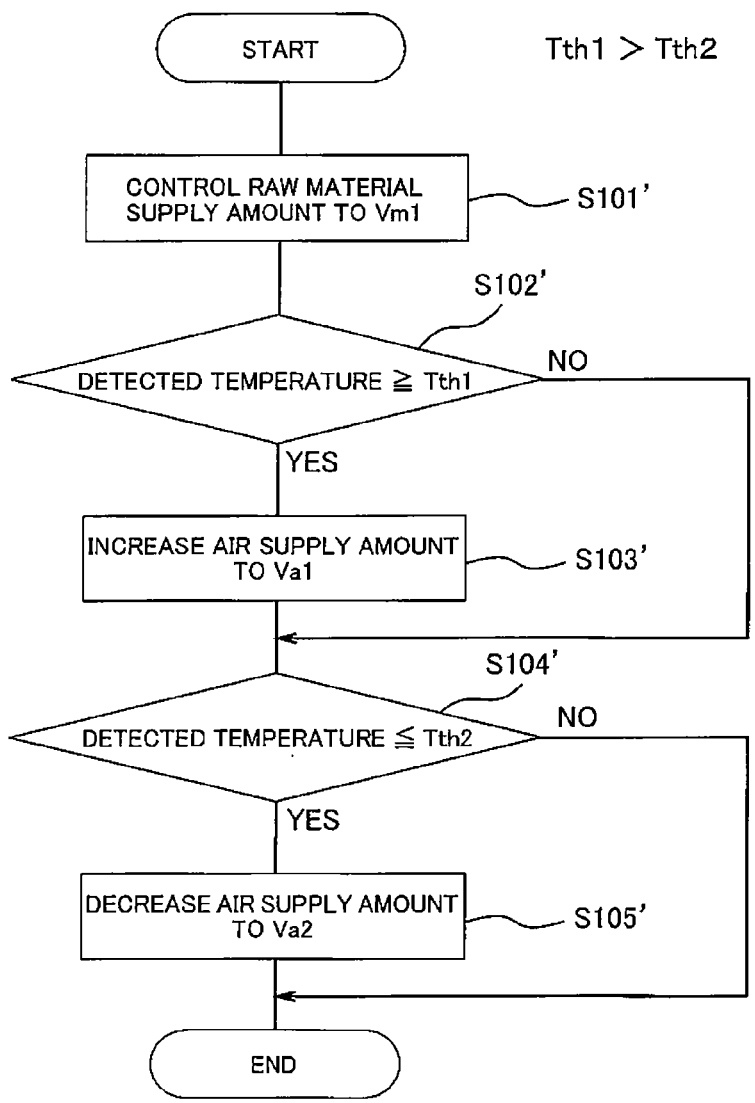
FIG. 4 is a flow chart showing one example of temperature control of the fuel cell system of Modification Example 2 of Embodiment 2 of the present invention.

FIG. 4 is a flow chart showing one example of the temperature control in the fuel cell system according to Modification Example 2 of Embodiment 2 of the present invention. Hereinafter, the temperature control in the present modification example will be explained in reference to FIG. 4.

When a temperature control routine during the electric power generation stand-by is started (START), first, the controller 28 controls the booster pump 11 and the flow rate control valve 15 such that the amount of raw material supplied to the hydrogen generating unit 16 (the reformer in the hydrogen generating unit 16) becomes Vm1 (Step S101').

Next, whether or not the temperature detected by the temperature detector 17 is equal to or higher than Tth1 is determined (Step S102'). When the determination result is YES, the amount of air supplied by the combustion air supply unit is increased to Va1 (Step S103'). By the increase in the amount of air supplied, the amount of cooling of the hydrogen generating unit 16 increases, and the temperature of the hydrogen generating unit 16 decreases.

When Step S103' terminates, or when the determination result in Step S102' is NO, whether or not the temperature detected by the temperature detector 17 is equal to or lower than Tth2 is determined (Step S104'). When the determination result is YES, the amount of air supplied by the combustion air supply unit is decreased to Va2 (Step S105'). By the decrease in the amount of air supplied, the amount of cooling also decreases, and the temperature of the hydrogen generating unit 16 increases.

When Step S105' terminates, or when the determination result in Step S104' is NO, the temperature control routine terminates (END). At this time, a control operation of returning to Step S101' or Step S102' may be performed.

Here, Tth1 is larger than Tth2, and Va1 is larger than Va2. For example, Tth1 may be the above-described upper limit equal to or lower than the heatproof temperature of the hydrogen generating unit 16. Tth2 is a temperature threshold for determining whether to stop the cooling operation of the hydrogen generating unit 16 by the increase in the amount of air supplied and is a value determined with respect to the above Tth1 to achieve hysteresis.

To suppress the excessive temperature increase of the hydrogen generating unit 16, Vm1 may be set to a raw material supply amount smaller than a raw material supply amount which is set to correspond to a maximum electric power generation amount of the fuel cell system. It is preferable that Vm1 be set to a raw material supply amount smaller than a raw material supply amount which is set to correspond to an intermediate electric power generation amount (intermediate value between the maximum electric power generation amount and a minimum electric power generation amount) of the fuel cell system. It is further preferable that Vm1 be set to a raw material supply amount smaller than a raw material supply amount which is set to correspond to the minimum electric power generation amount of the fuel cell system.

In a case where Vm1 is the raw material supply amount smaller than the raw material supply amount which is set to correspond to the minimum electric power generation amount of the fuel cell system, and the electric power generation start command unit receives the electric power generation start command, the controller may stop the electric power generation stand-by, control the raw material supply unit (for example, the booster pump 11) such that the raw material supply amount becomes the raw material supply amount which is set to correspond to the minimum electric power generation amount of the fuel cell system, and start the electric power generating operation interconnected with the electric power system.

When starting the electric power generating operation interconnected with the electric power system, typically, the raw material supply unit is controlled such that the raw material supply amount becomes the raw material supply amount which is set to correspond to the electric power generation amount of the fuel cell system, the electric power generation amount corresponding to the electric power demand of an external electric power load. Therefore, there is a possibility that before the fuel cell system starts the electric power generation, the excessive temperature increase of the hydrogen generating unit occurs. However, as above, the raw material, the amount of which is set to correspond to the minimum electric power generation amount, is supplied to the hydrogen generating unit 16 regardless of the degree of the demand of the external electric power load, so that such possibility is reduced.

Embodiment 3

The fuel cell system of Embodiment 3 is different from the fuel cell system 200 of Embodiment 2 in that when an upper stand-by time limit has elapsed since the start of the electric power generation stand-by, the electric power generation of the fuel cell is started even if the electric power generation start command is not input. Since the device configuration of a fuel cell system 300 of the present embodiment is the same as that of the fuel cell system 200 (FIG. 3) of Embodiment 2, the same reference signs and names are used for the same components, and explanations thereof are omitted.

Operations

Figure 5:
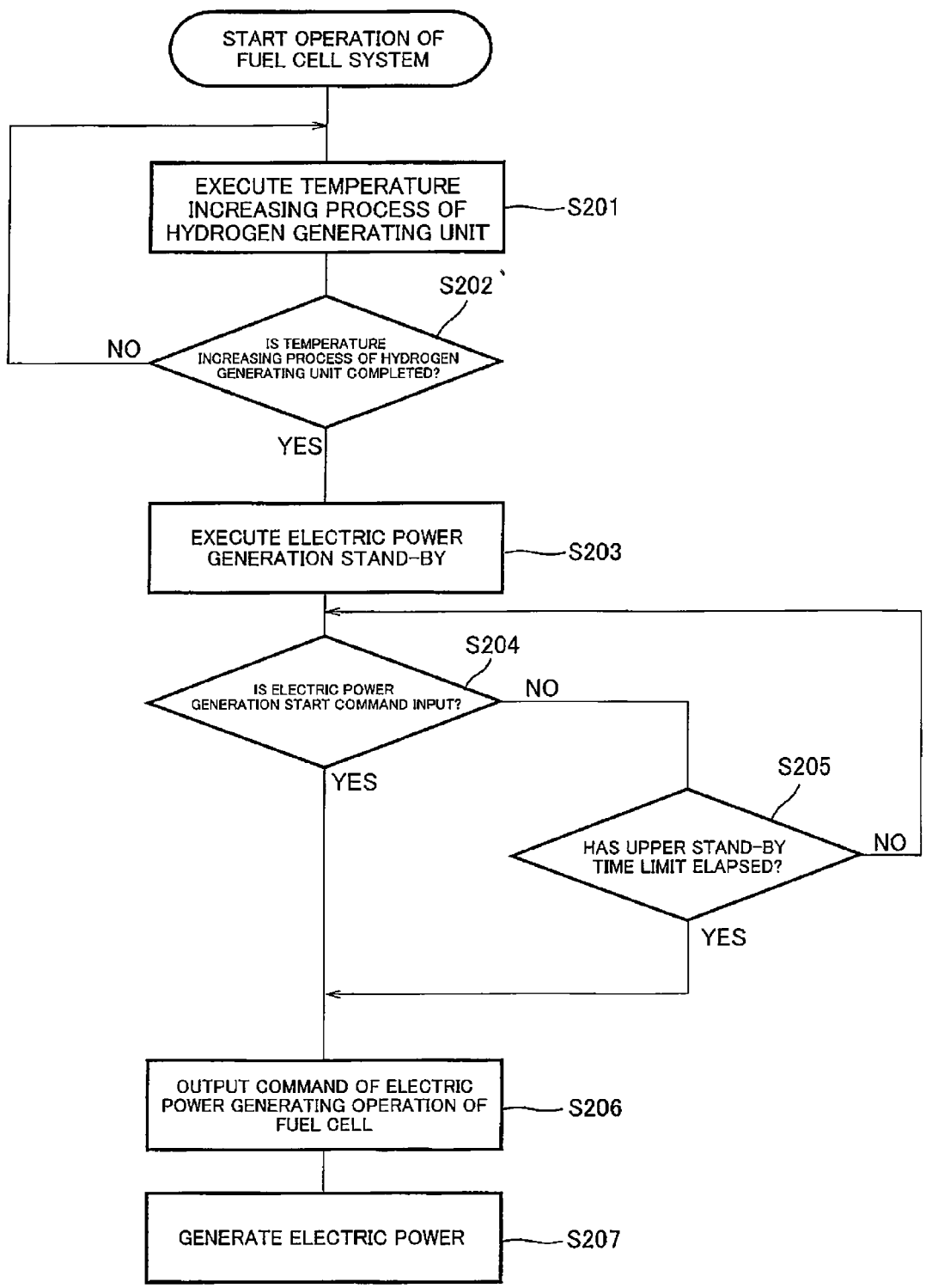
FIG. 5 is a flow chart schematically showing one example of the start-up process of the fuel cell system of Embodiment 3 of the present invention.

FIG. 5 is a flow chart schematically showing one example of the start-up process (program executed by the controller 28 when the fuel cell system 300 starts up) of the fuel cell system 300 of Embodiment 3 of the present invention.

When the start-up command is input to the start-up command unit 30 by the operator, the controller 28 starts the operation of the fuel cell system 300. With this, the temperature increasing process of the hydrogen generating unit is started (Step S201).

The temperature increasing process of the hydrogen generating unit herein is the same as that in Embodiment 2, so that an explanation thereof is omitted. Also in the present embodiment, the switching unit 13 is switched to the bypass passage 23 in the temperature increasing process of the hydrogen generating unit. When the hydrogen generating unit 16 reaches a predetermined temperature or higher, the controller 28 completes the temperature increasing process of the hydrogen generating unit (Step S202) and executes the electric power generation stand-by (Step S203). The electric power generation stand-by herein is the same as that in Embodiment 2, so that an explanation thereof is omitted.

While executing the electric power generation stand-by, the controller 28 determines whether or not the electric power generation start command is input to the electric power generation start command unit 32 by the operator (Step S204).

When the determination result of Step S204 is YES, the start of the electric power generating operation of the fuel cell 10 is commanded (Step S206). With this, the supply of the air as the oxidizing gas from the air supply device 20 to the fuel cell 10 is started, and the electric power generating step is started (Step S207). Specifically, the parallel off unit 37 is turned on, and the electric power is obtained from the electric power converter 26 and supplied to, for example, home electric power loads (external loads) interconnected with the electric power system (commercial system).

When the determination result of Step S204 is NO, whether or not the upper stand-by time limit has elapsed since the start of the electric power generation stand-by is determined (Step S205). The above upper stand-by time limit is set so as to prevent a case where when the arrival of the observer is behind schedule, the electric power generation stand-by endlessly continues, and the amount of energy consumed by the electric power generation stand-by endlessly increases. For example, it is preferable that the upper stand-by time limit be half an hour to several hours. However, the upper stand-by time limit is not limited to this.

When the determination result of Step S205 is NO, the electric power generation stand-by (Step S203) continues.

When the determination result of Step S205 is YES, the start of the electric power generating operation of the fuel cell system 200 is commanded by the control of the controller 28 even if the electric power generation start command is not input by the operator via the electric power generation start command unit 32 (Step S206). With this, the supply of the air as the oxidizing gas from the air supply device 20 to the fuel cell 10 is started, and the electric power generating step is started (Step S207). That is, when the upper stand-by time limit has elapsed since the completion of the temperature increasing process of the hydrogen generating unit (since the start of the electric power generation stand-by), the controller 28 stops the electric power generation stand-by and starts the electric power generation of the fuel cell even if the electric power generation start command is not input to the electric power generation start command unit 32 by the operator. Specifically, the parallel off unit 37 is turned on, and the electric power is obtained from the electric power converter 26 and supplied to, for example, home electric power loads (external loads) interconnected with the electric power system (commercial system).

A known process may be used as an operation termination process of the fuel cell system 300, so that an explanation thereof is omitted.

The present embodiment can also obtain the same effects as Embodiment 1.

Further, in the present embodiment, when the arrival of the observer is behind schedule, the electric power generation is started after the upper stand-by time limit has elapsed. With this control, it is possible to prevent a case where the electric power generation stand-by endlessly continues, and the amount of energy consumed by the electric power generation stand-by increases.

Modification Example

In the fuel cell system of Embodiment 3, during the electric power generation stand-by, the hydrogen-containing gas is supplied from the hydrogen generating unit to the fuel cell. The fuel cell system of the present modification example is different from the fuel cell system of Embodiment 3 in that during the electric power generation stand-by, the supply of the hydrogen-containing gas from the hydrogen generating unit to the fuel cell stands by.

The device configuration of the fuel cell system of the present modification example is the same as that of the fuel cell system of Embodiment 3. Therefore, the same reference signs and names are used for the same components, and detailed explanations thereof are omitted.

The operations of the fuel cell system of the present modification example are substantially the same as the operations (FIG. 5) of the fuel cell system of Embodiment 3 described above. Hereinafter, the operations of the fuel cell system of the present modification example will be explained.

Steps S201 to S204 in FIG. 5 are the same as those in the present modification example. However, the electric power generation stand-by herein is the same as that in Modification Example 1 of Embodiment 2.

When the determination result of a step corresponding to Step S204 is YES, the bypass switching valve 13 is switched to the fuel cell 10. With this, the supply of the fuel gas from the hydrogen generating unit 16 to the fuel cell 10 is started (Step corresponding to Step S206), and at the same time, the supply of the oxidizing gas from the air supply device 20 to the fuel cell 10 is started. Thus, the electric power generating step is started (Step corresponding to Step S207). Specifically, the electric power is obtained from the electric power converter 26 and supplied to, for example, home electric power loads (external loads) interconnected with the electric power system (commercial system).

Regarding Step S205 of FIG. 5, the fuel cell system of the present modification example may be the same as that of Embodiment 3. However, when the determination result of Step S205 is YES, the start of the electric power generating operation of the fuel cell system 200 is commanded by the control of the controller 28 even if the electric power generation start command is not input by the operator via the electric power generation start command unit 32. Then, the supply of the fuel gas from the hydrogen generating unit 16 to the fuel cell 10 is started (Step corresponding to Step S206), and at the same time, the supply of the oxidizing gas from the air supply device 20 to the fuel cell 10 is started. Thus, the electric power generating step is started (Step corresponding to Step S207). To be specific, the parallel off unit 37 is turned on, and the electric power is obtained from the electric power converter 26 and supplied to, for example, home electric power loads (external loads) interconnected with the electric power system (commercial system).

When the upper stand-by time limit has elapsed since the completion of the temperature increasing process of the hydrogen generating unit (since the start of the electric power generation stand-by), the controller 28 stops the electric power generation stand-by, starts the supply of the hydrogen-containing gas from the hydrogen generating unit to the fuel cell, and starts the electric power generating operation interconnected with the electric power system of the fuel cell system even if the electric power generation start command is not input by the operator to the electric power generation start command unit 32.

In accordance with the fuel cell system of the present modification example, it is possible to prevent a case where when the arrival of the observer is behind schedule, the electric power generation stand-by endlessly continues, and the amount of energy increases.

Embodiment 4

Next, the fuel cell system of Embodiment 4 will be explained. Unlike the fuel cell system of Embodiment 3, the fuel cell system of the present embodiment is characterized in that the electric power generation stand-by is stopped after the upper stand-by time limit has elapsed since the completion of the temperature increasing process of the hydrogen generating unit and the start of the electric power generation stand-by.

The device configuration of the fuel cell system of the present embodiment may be the same as that of the fuel cell system 100 of Embodiment 1 or that of the fuel cell system 200 of Embodiment 2, so that a detailed explanation thereof is omitted.

The operation flow of the fuel cell system of the present embodiment is designed such that when the determination result is YES in Step S205 of the operations (flow chart of FIG. 5) of the fuel cell system of Embodiment 3, the step of stopping the electric power generation stand-by is performed instead of the step of commanding the fuel cell to start the electric power generating operation. The other operations herein are the same as those in Embodiment 3, so that detailed explanations thereof are omitted.

When the determination result of Step S205 is YES, the operation of the fuel cell system may be stopped instead of performing the step of stopping the electric power generation stand-by.

With this configuration, it is possible to prevent a case where when the arrival of the observer is behind schedule, the electric power generation stand-by endlessly continues, and the energy consumption increases.

Embodiment 5

The fuel cell system of Embodiment 5 is different from the fuel cell system 200 of Embodiment 2 in that: if the electric power generation start is not commanded when the upper stand-by time limit has elapsed since the start of the electric power generation stand-by, the electric power generation stand-by including the temperature maintaining process stops; and the temperature increasing process of the hydrogen generating unit is executed again at a time point when the temperature of the hydrogen generating unit is decreased to a predetermined temperature or lower. The device configuration of a fuel cell system 400 of the present embodiment is the same as that of the fuel cell system 200 (FIG. 3) of Embodiment 2, so that the same reference signs and names are used for the same components, and explanations thereof are omitted.

Operations

Figure 6:
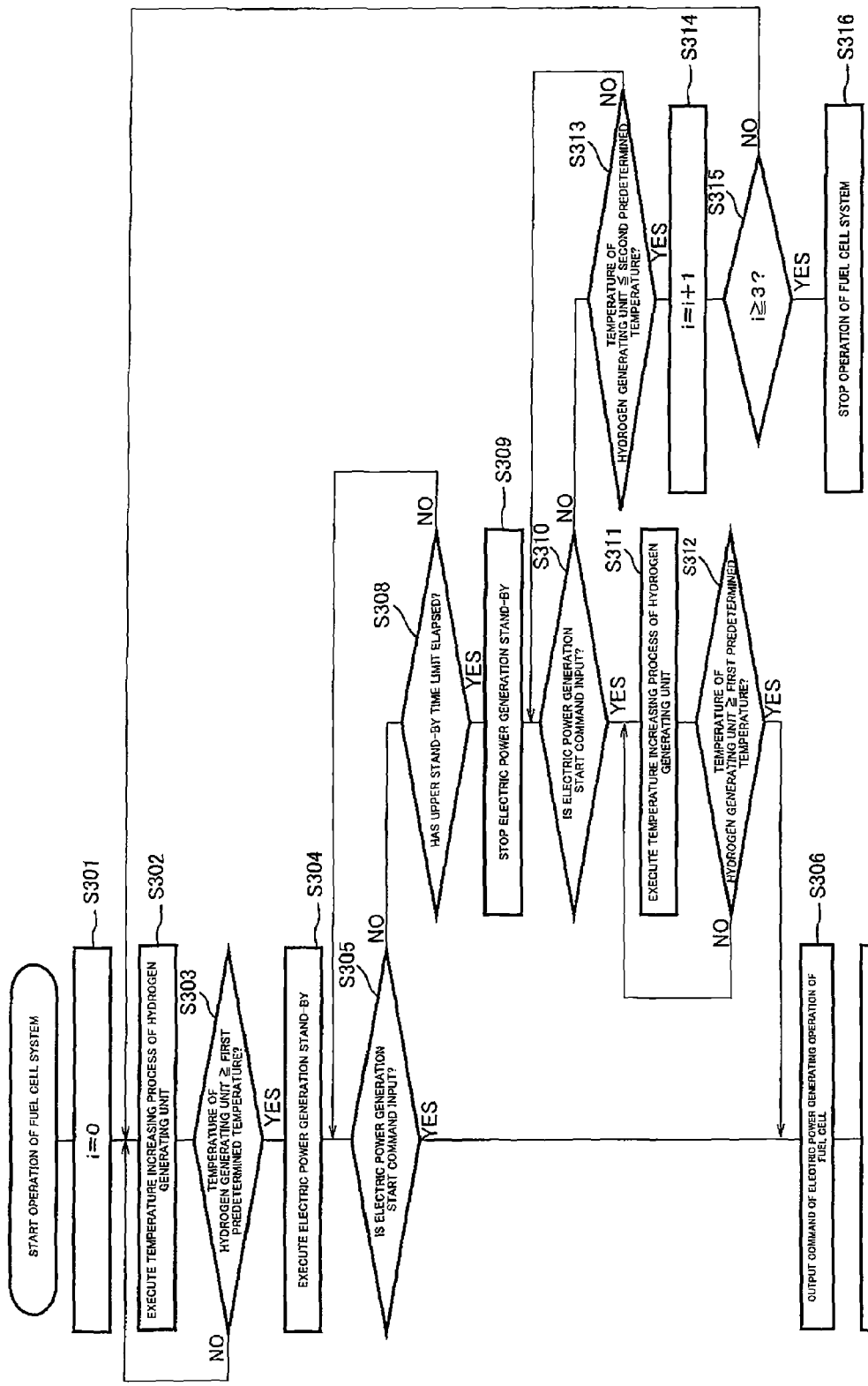
FIG. 6 is a flow chart schematically showing one example of the start-up process of the fuel cell system of Embodiment 5 of the present invention.

FIG. 6 is a flow chart schematically showing one example of the start-up process (program executed by the controller 28 when the fuel cell system 400 starts up) of the fuel cell system 400 of Embodiment 5 of the present invention.

When the start-up command is input to the start-up command unit 30 by the operator, the controller 28 starts the operations of the fuel cell system 400. First, zero is substituted in a variable i and stored in the memory 27 (Step S301), and the temperature increasing process of the hydrogen generating unit 16 is started (Step S302).

The temperature increasing process of the hydrogen generating unit 16 herein is the same as that in Embodiment 2, so that an explanation thereof is omitted. Also in the present embodiment, the switching unit 13 is switched to the bypass passage 23 in the temperature increasing process of the hydrogen generating unit 16. When the hydrogen generating unit 16 reaches a first predetermined temperature or higher, the temperature increasing process of the hydrogen generating unit 16 is completed (Step S303), and the electric power generation stand-by is executed while performing the temperature maintaining process of the hydrogen generating unit 16 (Step S304). The electric power generation stand-by herein is the same as that in Embodiment 2, so that an explanation thereof is omitted.

While executing the electric power generation stand-by, the controller 28 determines whether or not the electric power generation start command is input to the electric power generation start command unit 32 by the operator (Step S305).

When the observer of the electric power company confirms that the set points of the system interconnection protective device 35 are proper, and the electric power generation start command is input to the electric power generation start command unit 32 by the operator, and the determination result of Step S305 is YES, the start of the electric power generating operation of the fuel cell 10 is commanded (Step S306). Then, the supply of the air as the oxidizing gas from the air supply device 20 to the fuel cell 10 is started, and the electric power generating step is started (Step S307).

When the determination result of Step S305 is NO, whether or not the upper stand-by time limit (most preferably, about several hours) has elapsed since the start of the electric power generation stand-by is determined (Step S308).

When the determination result of Step S308 is NO, the electric power generation stand-by including the temperature maintaining process (Step S304) continues.

When the determination result of Step S308 is YES, the electric power generation stand-by including the temperature maintaining process stops (Step S309). Specifically, the supply of the raw material to the hydrogen generating unit 16 stops, and this stops the generation of the hydrogen-containing gas. In addition, the combustion in the combustor 19 (the temperature maintaining process of the hydrogen generating unit 16) also stops.

When the electric power generation stand-by stops, the controller 28 causes the switching unit 13 to be switched to the bypass passage 23 and determines whether or not the electric power generation start command is input to the electric power generation start command unit 32 by the operator (Step S310).

When the determination result of Step S310 is YES, the supply of the raw material to the hydrogen generating unit 16 and the combustion in the combustor 19 are restarted, and the temperature increasing process of the hydrogen generating unit 16 is started (Step S311). When the temperature of the hydrogen generating unit 16 reaches a first predetermined temperature (For example, the temperature of the reformer of the hydrogen generating unit is about 650° C.) or higher, the temperature increasing process of the hydrogen generating unit 16 completes (Step S312). Then, the switching unit 13 is switched to the fuel cell 10, and the supply of the fuel gas from the hydrogen generating unit 16 to the fuel cell 10 is started (Step S306). At the same time, the supply of the oxidizing gas from the air supply device 20 to the fuel cell 10 is started, and the electric power generating step is started (Step S307). Specifically, the parallel off unit 37 is turned on, and the electric power is obtained from the electric power converter 26 and supplied to, for example, home electric power loads (external loads) interconnected with the electric power system (commercial system).

When the determination result of Step S310 is NO, whether or not the temperature of the hydrogen generating unit 16 is decreased to a second predetermined temperature or lower is determined (Step S313). Here, the second predetermined temperature is lower than the first predetermined temperature. For example, the second predetermined temperature is defined as the lower temperature limit at which the hydrogen generating unit 16 can generate the hydrogen-containing gas. The second predetermined temperature as the temperature of the reformer of the hydrogen generating unit 16 may be about 300° C.

When the determination result of Step S313 is NO, Step S310 is executed again. To be specific, the stop state of the electric power generation stand-by is maintained until the temperature of the hydrogen generating unit 16 decreases to the second predetermined temperature.

When the determination result of Step S313 is YES, one is added to i (Step S314), and whether or not i is three or more is determined (Step S315).

When the determination result of Step S315 is NO, Step S302 is executed again. With this, until i becomes three or more, the electric power generation stand-by is repeated while performing the temperature increasing process and temperature maintaining process of the hydrogen generating unit 16. It is preferable that the difference between the second predetermined temperature and the first predetermined temperature be set such that it requires about over ten minutes to heat the hydrogen generating unit 16 up to the first predetermined temperature in another temperature increasing process of the hydrogen generating unit 16.

When the determination result of Step S315 is YES, the operation of the fuel cell system terminates (Step S316). A known process can be used as the operation termination process of the fuel cell system 300, so that an explanation thereof is omitted.

In the foregoing explanation, the operation of the fuel cell system is terminated when i becomes three or more. However, the threshold is not limited to three, and may be, for example, two or four.

The present embodiment can also obtain the same effects as Embodiment 1.

Further, in the present embodiment, it is possible to prevent a case where when the arrival of the observer is behind schedule, the electric power generation stand-by endlessly continues, and the amount of energy consumed by the electric power generation stand-by endlessly increases.

Modification Example 1

In the fuel cell system of Embodiment 5, during the electric power generation stand-by, the hydrogen-containing gas is supplied from the hydrogen generating unit to the fuel cell. The fuel cell system of the present modification example is different from the fuel cell system of Embodiment 5 in that during the electric power generation stand-by, the supply of the hydrogen-containing gas from the hydrogen generating unit to the fuel cell stands by.

The device configuration of the fuel cell system of the present modification example is the same as that of the fuel cell system of Embodiment 5. Therefore, the same reference signs and names are used for the same components, and detailed explanations thereof are omitted.

The operations of the fuel cell system of the present modification example are substantially the same as the operations (FIG. 6) of the fuel cell system of Embodiment 5 described above. Hereinafter, the operations of the fuel cell system of the present modification example will be explained.

Steps S301 to S305 of FIG. 6 are the same as those of the present modification example. However, the electric power generation stand-by herein is the same as that of Modification Example of Embodiment 2.

When the determination result of a step corresponding to Step S305 becomes YES, the switching unit 13 is switched to the fuel cell 10. With this, the supply of the fuel gas from the hydrogen generating unit 16 to the fuel cell 10 is started (Step corresponding to Step 306), and at the same time, the supply of the oxidizing gas from the air supply device 20 to the fuel cell 10 is started. Thus, the electric power generating step is started (Step corresponding to Step S307). Specifically, the parallel off unit 37 is turned on, and the electric power is obtained from the electric power converter 26 and supplied to, for example, home electric power loads (external loads) interconnected with the electric power system (commercial system).

Steps S308 to SS316 of FIG. 6 are the same as those of the present modification example, Steps S308 to SS316 being executed when the determination result of Step S305 is NO.

The fuel cell system of the present modification example described above can also obtain the same effects as that of Embodiment 5.

Modification Example 2

In the foregoing explanation, the device configuration is the same as that of the fuel cell system 200 of Embodiment 2. However, it may be the same as the device configuration of the fuel cell system 100 of Embodiment 1. In the present modification example, the temperature increasing process of the hydrogen generating unit 16 and the temperature maintaining process of the hydrogen generating unit 16 are performed by operating the heater 18.

During the electric power generation stand-by, as with Embodiment 1, the controller 28 controls the booster pump 11 and the flow rate control valve 15 to start supplying the raw material to the hydrogen generating unit 16. Moreover, the supply of the water from the water supply unit, not shown, is started, the hydrogen-containing gas is generated by the reforming reaction, and the supply of the fuel gas from the hydrogen generating unit 16 to the fuel cell 10 is started. The other operations herein are the same as those of the fuel cell system of Embodiment 5 described above, so that explanations thereof are omitted.

Moreover, as with Modification Example 1 of Embodiment 1, the present modification example may be such that during the electric power generation stand-by, the generation of the hydrogen-containing gas by the hydrogen generating unit stands by while executing the temperature maintaining process. With this, the supply of the hydrogen-containing gas from the hydrogen generating unit to the fuel cell stands by. Moreover, even in this case, the other operations herein are the same as those of the fuel cell system of Embodiment 5 described above, so that explanations thereof are omitted.

The fuel cell system of the present modification example described above can also obtain the same effects as that of Embodiment 5.

Embodiment 6

Device Configuration

Figure 7:
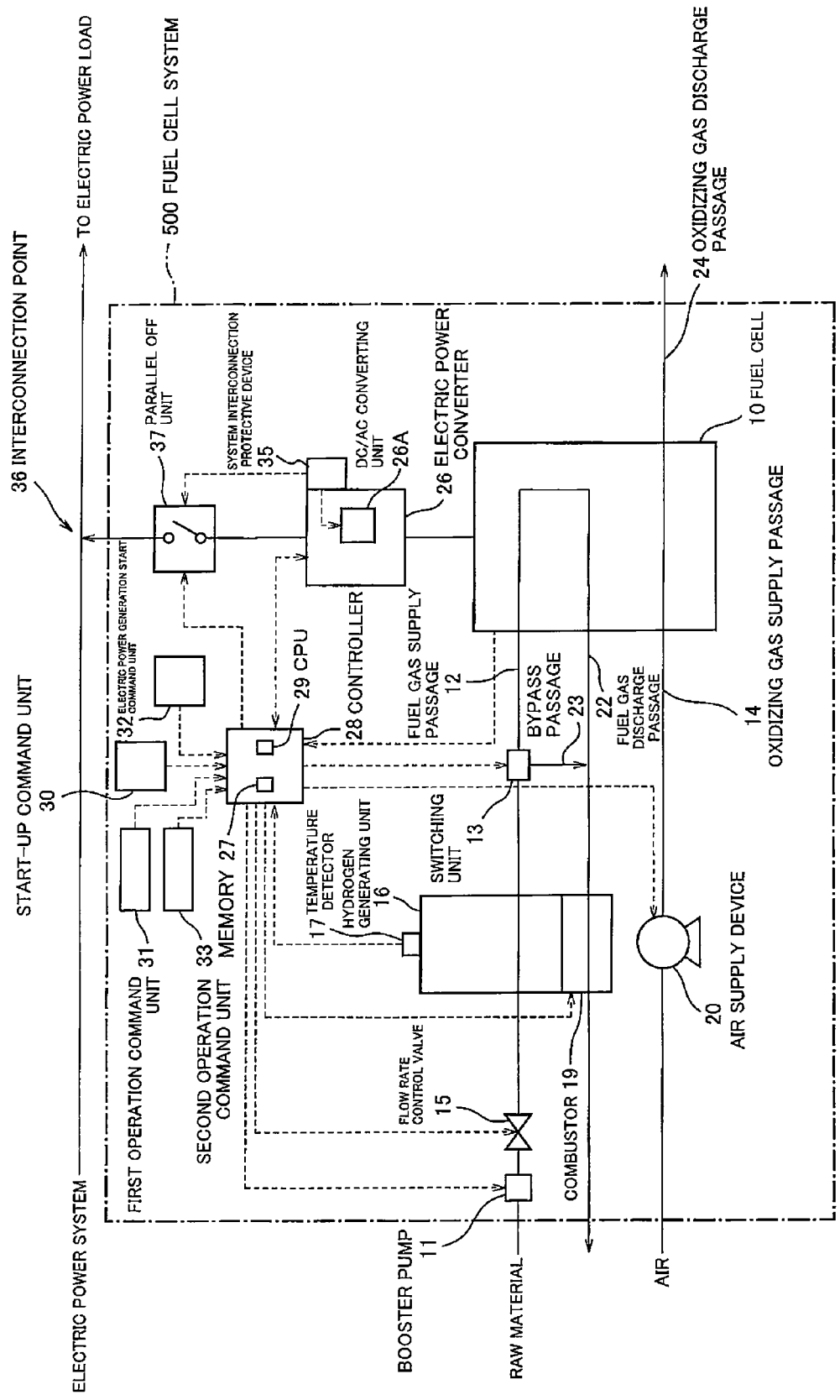
FIG. 7 is a block diagram showing one example of the schematic configuration of the fuel cell system of Embodiment 6 of the present invention.

FIG. 7 is a block diagram showing one example of the schematic configuration of the fuel cell system of Embodiment 6 of the present invention.

The device configuration of a fuel cell system 500 of the present embodiment is the same as that of the fuel cell system 200 (FIG. 3) of Embodiment 2 except that a first operation command unit 31 and a second operation command unit 33 are additionally provided. Therefore, the same reference signs and names are used for the same components as in the fuel cell system 200, and explanations thereof are omitted.

Each of the first operation command unit 31 and the second operation command unit 33 includes, for example, a button. When the operator presses the button of the first operation command unit 31, an operation mode of the fuel cell system 500 being a first operation method is commanded to the controller 28. When the operator presses the button of the second operation command unit 33, the operation mode of the fuel cell system 500 being a second operation method is commanded to the controller 28.

Operations

Before the start of the operation of the fuel cell system, the operator operates the first operation command unit 31 or the second operation command unit 33 to command the first operation method or the second operation method as the operation mode of the fuel cell system 500.

When the start-up command is input to the start-up command unit 30 by the operator, the controller 28 starts the operations of the fuel cell system 500. With this, the temperature increasing process of the hydrogen generating unit is started. In the temperature increasing process of the hydrogen generating unit, the switching unit 13 is switched (the switching unit 13 is switched to the bypass passage 23) such that the gas discharged from the hydrogen generating unit 16 is supplied through the bypass passage 23 and the fuel gas discharge passage 22 to the combustor 19. Then, the controller 28 controls the combustor 19 such that the temperature of the hydrogen generating unit 16 is increased up to a temperature equal to or higher than a predetermined temperature (For example, the temperature of the reformer of the hydrogen generating unit is about 650° C.) at which the hydrogen-containing gas can be supplied to the fuel cell during the electric power generating operation. When the temperature of the hydrogen generating unit 16 reaches the predetermined temperature, the controller 28 completes the temperature increasing process of the hydrogen generating unit.

In a case where the first operation method is commanded by the first operation command unit 31, the switching unit 13 is switched to the fuel cell 10 after the completion of the temperature increasing process of the hydrogen generating unit, and the supply of the gas discharged from the hydrogen generating unit 16 to the fuel cell 10 is started. Until the electric power generation start command is input from the electric power generation start command unit 32, the controller 28 causes the combustor 19 to combust the gas discharged from the fuel cell 10 and maintains the temperature of the hydrogen generating unit 16 in a predetermined temperature range (For example, the temperature of the reformer of the hydrogen generating unit 16 is about 630 to 670° C.) (electric power generation stand-by). During the electric power generation stand-by, the temperature maintaining process of the hydrogen generating unit 16 is executed by the combustor 19 as above.

Then, when the observer of the electric power company confirms that the set points of the system interconnection protective device 35 are proper, and the operator operates the electric power generation start command unit 32 to command the start of the electric power generation of the fuel cell 10, the supply of the air as the oxidizing gas from the air supply device 20 to the fuel cell 10 is started. Then, the electric power generating step is started.

In a case where the second operation method is commanded by the second operation command unit 33, the electric power generating step is directly started without executing the electric power generation stand-by after the completion of the temperature increasing process of the hydrogen generating unit. To be specific, the switching unit 13 is switched to the fuel cell 10, the gas discharged from the hydrogen generating unit 16 is supplied to the fuel cell 10, and the supply of the air as the oxidizing gas from the air supply device 20 to the fuel cell 10 is also started. Then, the electric power generating step is started. Specifically, the parallel off unit 37 is turned on, and the electric power is obtained from the electric power converter 26 and supplied to, for example, home electric power loads (external loads) interconnected with the electric power system (commercial system).

The fuel cell system of the present embodiment includes: the bypass passage 23 configured to bypass the fuel cell 10 and be connected to the fuel gas discharge passage 22; and the switching unit 13 configured to switch the destination, to which the gas discharged from the hydrogen generating unit 16 flows, between the fuel cell 10 and the bypass passage 23. However, in a case where the fuel cell 10 is a fuel cell, such as a solid-oxide fuel cell, which is less likely to deteriorate by the carbon monoxide contained in the fuel gas, the fuel cell system may be configured such that: the bypass passage 23 and the switching unit 13 are not provided; and the fuel gas discharged in the temperature increasing process of the hydrogen generating unit 16 is supplied to the fuel cell 10.

In the present embodiment, when the observation by the observer is necessary, the first operation method is commanded. With this, the electric power generation stand-by can be performed. In contrast, when the observation by the observer is unnecessary in a normal operation after the observation once, the second operation method is commanded. With this, the electric power generation interconnected with the electric power system can be started without executing the electric power generation stand-by. In accordance with this configuration, it is possible to suppress the loss of energy by unnecessary execution of the electric power generation stand-by.

Modification Example 1

In the fuel cell system of Embodiment 6, during the electric power generation stand-by, the hydrogen-containing gas is supplied from the hydrogen generating unit to the fuel cell. The fuel cell system of the present modification example is different from the fuel cell system of Embodiment 6 in that during the electric power generation stand-by, the supply of the hydrogen-containing gas from the hydrogen generating unit to the fuel cell stands by.

The device configuration of the fuel cell system of the present modification example is the same as that of the fuel cell system of Embodiment 6. Therefore, the same reference signs and names are used for the same components, and detailed explanations thereof are omitted.

The operations of the fuel cell system of the present modification example are the same as the operations of the fuel cell system of Embodiment 6 except that: the supply of the hydrogen-containing gas from the hydrogen generating unit to the fuel cell stands by during the electric power generation stand-by; and by the electric power generation start command, the supply of the fuel gas from the hydrogen generating unit 16 to the fuel cell 10 is started, and at the same time, the supply of the oxidizing gas from the air supply device 20 to the fuel cell 10 is started, and thus, the electric power generating step is started.

The fuel cell system of the present modification example described above can also obtain the same effects as that of Embodiment 6.

Modification Example 2

In the foregoing explanation, the device configuration is such that the first operation command unit 31 and the second operation command unit 33 are added to the fuel cell system 200 of Embodiment 2. However, the device configuration may be such that the first operation command unit 31 and the second operation command unit 33 are added to the fuel cell system 100 of Embodiment 1. In the present modification example, the temperature increasing process of the hydrogen generating unit 16 and the temperature maintaining process of the hydrogen generating unit 16 are performed by operating the heater 18. During the electric power generation stand-by, as with Embodiment 1, the controller 28 controls the booster pump 11 and the flow rate control valve 15 to start supplying the raw material to the hydrogen generating unit 16. Moreover, the supply of the water from the water supply unit, not shown, is started, the hydrogen-containing gas is generated by the reforming reaction, and the supply of the fuel gas from the hydrogen generating unit 16 to the fuel cell 10 is started. The other operations herein are the same as those of the fuel cell system of Embodiment 6 described above, so that explanations thereof are omitted.

Moreover, as with Modification Example 1 of Embodiment 1, the present modification example may be such that the generation of the hydrogen-containing gas by the hydrogen generating unit stands by while executing the temperature maintaining process during the electric power generation stand-by. Moreover, even in this case, the other operations are the same as those of the fuel cell system of Embodiment 5 described above, so that explanations thereof are omitted.

Moreover, as with Modification Example 2 of Embodiment 1, the present modification example may be such that during the electric power generation stand-by, the generation of the hydrogen-containing gas by the hydrogen generating unit stands by, and the temperature maintaining process is not executed. Moreover, even in this case, the other operations are the same as those of the fuel cell system of Embodiment 5 described above, so that explanations thereof are omitted.

The fuel cell system of the present modification example described above can also obtain the same effects as that of Embodiment 6.

Embodiment 7

Device Configuration

Figure 8:
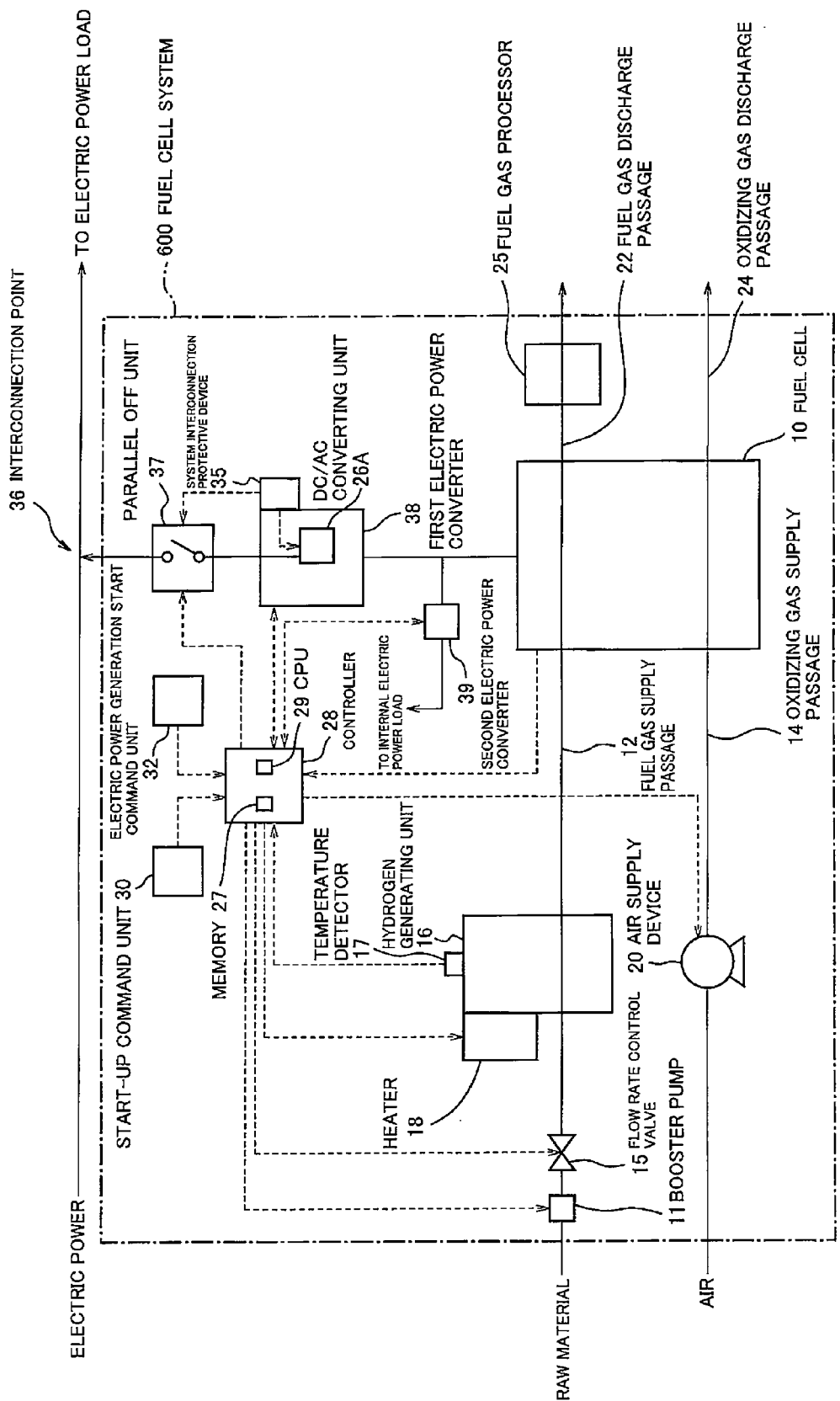
FIG. 8 is a block diagram showing one example of the schematic configuration of the fuel cell system of Embodiment 7 of the present invention.

FIG. 8 is a block diagram showing one example of the schematic configuration of the fuel cell system of Embodiment 7 of the present invention.

The device configuration of a fuel cell system 600 of the present embodiment is the same as that of the fuel cell system 100 (FIG. 1) of Embodiment 1 except that: the electric power converter 26 of the fuel cell system 100 is replaced with a first electric power converter 38; and a second electric power converter 39 is additionally disposed on a line branching from a line connecting the output of the fuel cell and the first electric power converter 38. Therefore, the same reference signs and names are used for the same components as in the fuel cell system 100, and explanations thereof are omitted.

Since the first electric power converter 38 is the same in configuration as the electric power converter 26, a detailed explanation thereof is omitted.

For example, used as the second electric power converter 39 is a DC/DC converter configured to convert the voltage of input DC power and output the DC power having a different voltage. The second electric power converter 39 converts the DC power, input from the fuel cell 10, into the DC power having a desired voltage and outputs the DC power to internal electric power loads (for example, electric auxiliary devices, such as the booster pump 11, the air supply device 20, and a surplus electric power heater) of the fuel cell system. In some cases, the second electric power converter 39 outputs the DC power, input from the fuel cell 10, to the first electric power converter 38 without change. Moreover, in some cases, the second electric power converter 39 outputs the DC power, input from the fuel cell 10, to the first electric power converter 38 without change, and at the same time, outputs the DC power, whose voltage is adjusted, to the internal electric power loads. The second electric power converter 39 is connected to the controller 28 so as to be able to communicate with the controller 28. The adjustment of a destination to which the fuel cell 10 outputs the DC power (the adjustment between the first electric power converter 38 and the second electric power converter 39) is performed based on the control of the controller 28.

Operations

The operations of the fuel cell system 600 are substantially the same as the operations of the fuel cell system 100 shown in FIG. 2 but are different from the operations of the fuel cell system 100 as below.

To be specific, during the electric power generation stand-by of the fuel cell system 600 (Step corresponding to Step S103 of FIG. 2), the controller 28 controls the booster pump 11 and the flow rate control valve 15 to start supplying the raw material to the hydrogen generating unit 16, and starts supplying the water from the water supply unit, not shown. The hydrogen-containing gas is generated by the reforming reaction, and the supply of the hydrogen-containing gas from the hydrogen generating unit 16 to the fuel cell 10 is started. At the same time, the controller 28 starts the supply of the oxidizing gas from the air supply device 20 to the fuel cell 10. With this control, the electric power generation is performed by the fuel cell 10, and the DC power is output from the fuel cell 10.

By the control of the controller 28, the output DC power is converted by the second electric power converter 39 into the DC power having a desired voltage, and is supplied to the internal electric power loads (for example, the electric auxiliary devices, such as the booster pump 11, the air supply device 20, and the surplus electric power heater) of the fuel cell system.

When the electric power generation start command is input (see Step S104 in FIG. 2), the second electric power converter 39 starts supplying the electric power to the first electric power converter 38 by the control of the controller 28 (Step corresponding to Step S105 of FIG. 2). At the same time, the parallel off unit 37 is turned on, and the electric power generating operation interconnected with the electric power system is started (Step corresponding to Step S106 in FIG. 2).

The fuel cell system of the present embodiment can also obtain the same effects as that of Embodiment 1.

Moreover, the hydrogen-containing gas generated by the hydrogen generating unit during the electric power generation stand-by can be effectively utilized as the electric power by the electric power generation of the fuel cell system. Thus, the energy efficiency of the fuel cell system can be improved.

Modification Example

The fuel cell system of the present modification example is configured such that technological features of the fuel cell system of any one of Embodiments 2 to 6 are applied to the fuel cell system of Embodiment 7.

For example, the features of the fuel cell system of Embodiment 2 are applied to the fuel cell system of Embodiment 7. Such fuel cell system of the present modification example may be such that: the bypass passage 23 is formed; during the electric power generation stand-by, the hydrogen-containing gas generated by the hydrogen generating unit 16 is supplied to the fuel cell 10; and the exhaust gas discharged through an anode gas channel of the fuel cell 10 is combusted in the combustor 19 while performing the electric power generating operation.

Moreover, the features of the fuel cell system of Embodiment 3 are applied to the fuel cell system of Embodiment 7. Such fuel cell system of the present modification example may be such that: if the electric power generation stand-by continues for the stand-by upper limit or more, the electric power generating operation interconnected with the electric power system is started without the electric power generation start command.

Moreover, the features of the fuel cell system of Embodiment 5 are applied to the fuel cell system of Embodiment 7. Such fuel cell system of the present modification example may be such that: if the electric power generation start command is not input when the upper stand-by time limit has elapsed since the start of the electric power generation stand-by, the electric power generation stand-by stops; and the temperature increasing process of the hydrogen generating unit is executed again at the time point when the temperature of the hydrogen generating unit decreases to a predetermined temperature or lower.

Moreover, the features of the fuel cell system of Embodiment 6 are applied to the fuel cell system of Embodiment 7. Such fuel cell system of the present modification example may be such that: the first operation command unit 31 and the second operation command unit 33 are additionally provided; when the observation by the observer is necessary, the first operation method is commanded to perform the electric power generation stand-by; and when the observation by the observer is unnecessary in the normal operation after the observation once, the second operation method is commanded to directly start the electric power generation interconnected with the electric power system without executing the electric power generation stand-by. With this configuration, the same effects as each embodiment can be obtained herein.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention.

INDUSTRIAL APPLICABILITY

The present invention is useful as the fuel cell system capable of shortening the wait time of the observer who confirms the set points of the system interconnection protective device before starting the system interconnection operation, and as the method for operating the fuel cell system.

REFERENCE SIGNS LIST

10 fuel cell
12 fuel gas supply passage
13 bypass switching valve
14 oxidizing gas supply passage
16 hydrogen generating unit
17 temperature detector
18 heater
19 combustor (burner)
20 air supply device
22 fuel gas discharge passage
23 bypass passage
24 oxidizing gas discharge passage
25 fuel gas processor
26 electric power converter
26A DC/AC converting unit
27 memory
28 controller
29 CPU
30 start-up command unit
31 first operation command unit
32 electric power generation start command unit
33 second operation command unit
35 system interconnection protective device
36 interconnection point
37 parallel off unit
38 first electric power converter
39 second electric power converter
100 fuel cell system
200 fuel cell system
500 fuel cell system
600 fuel cell system

The invention claimed is:

1. A fuel cell system comprising:
a hydrogen generating unit configured to generate a hydrogen-containing gas by using a raw material;
a heater configured to heat the hydrogen generating unit;
an air supply device configured to supply an oxidizing gas;
a fuel cell configured to generate electric power by the hydrogen-containing gas supplied from the hydrogen generating unit and the oxidizing gas supplied from the air supply device;
an electric power generation start command unit configured to receive a command of start of an electric power generating operation of the fuel cell system, via a manual operation of an operator, the electric power generating operation being interconnected with a power supply system; and
a controller including processing circuitry and a memory storing a program, wherein the program, when executed by the processing circuitry, causes the controller to:

control the heater to maintain a temperature of the hydrogen generating unit within a predetermined temperature range and the fuel cell to perform a stand-by operation without causing the fuel cell to generate the electric power, before the electric power generation start command unit receives the command of the start of the electric power generating operation via the manual operation of the operator, wherein the temperature of the hydrogen generating unit by the heater is equal to or higher than a threshold at which the hydrogen generating unit is able to generate the hydrogen-containing gas; and cause the fuel cell to execute the electric power generating operation interconnected with the power supply system when the electric power generation start command unit receives the command of the start of the electric power generating operation via the manual operation of the operator.

2. The fuel cell system according to claim 1, wherein:
the heater is a combustor; and
during the stands-by operation at the fuel cell, the temperature of the hydrogen generating unit is maintained within the predetermined temperature range by using the hydrogen-containing gas supplied from the hydrogen generating unit.

3. The fuel cell system according to claim 2, wherein:
when the controller controls the fuel cell to perform the stand-by operation,
the hydrogen-containing gas from the hydrogen generating unit is not consumed by the fuel cell but is supplied to the combustor.

4. The fuel cell system according to claim 3, further comprising a raw material supply unit configured to supply the raw material to the hydrogen generating unit,
wherein the controller controls the raw material supply unit during the stand-by operation at the fuel cell such that an amount of raw material supplied by the raw material supply unit becomes smaller than a raw material supply amount set to correspond to a maximum electric power generation amount of the fuel cell system.

5. The fuel cell system according to claim 4, further comprising:
an air supply unit configured to supply combustion air to the combustor; and
a temperature detector configured to detect a temperature of the hydrogen generating unit,
wherein when the temperature detected by the temperature detector increases during the stand-by operation at the fuel cell, the controller controls the air supply unit to increases an amount of air supplied to the combustor.

6. The fuel cell system according to claim 3, further comprising a raw material supply unit configured to supply the raw material to the hydrogen generating unit,
wherein the controller controls the raw material supply unit during the stand-by operation at the fuel cell such that an amount of raw material supplied by the raw material supply unit becomes smaller than a raw material supply amount set to correspond to an intermediate electric power generation amount of the fuel cell system.

7. The fuel cell system according to claim 3, further comprising a raw material supply unit configured to supply the raw material to the hydrogen generating unit,
wherein the controller controls the raw material supply unit during the stand-by operation at the fuel cell such that an amount of raw material supplied by the raw material supply unit becomes smaller than a raw material supply amount set to correspond to a minimum electric power generation amount of the fuel cell system.

8. The fuel cell system according to claim 7, wherein the controller is configured to, when the electric power generation start command unit receives the command of the start of the electric power generating operation, control the raw material supply unit such that the amount of raw material supplied by the raw material supply unit becomes the raw material supply amount set to correspond to the minimum electric power generation amount of the fuel cell system, and cause the fuel cell to execute the electric power generating operation interconnected with the power supply system.

9. The fuel cell system according to claim 1, further comprising a temperature detector configured to detect a temperature of the hydrogen generating unit,
wherein the controller is configured to control the heater during the stand-by operation at the fuel cell such that the temperature detected by the temperature detector becomes equal to or lower than a heatproof temperature of the hydrogen generating unit.

10. The fuel cell system according to claim 1, further comprising a temperature detector configured to detect a temperature of the hydrogen generating unit,
wherein the controller controls the heater during the stand-by operation at the fuel cell such that the temperature detected by the temperature detector becomes equal to or higher than a lower temperature limit at which the hydrogen generating unit is able to generate the hydrogen-containing gas.

11. The fuel cell system according to claim 1, wherein the controller is configured to, when an upper stand-by time limit has elapsed since the fuel cell performs the stands-by operation, cause the fuel cell to execute the electric power generating operation interconnected with the power supply system.

12. The fuel cell system according to claim 1, wherein the controller is configured to control the fuel cell to stop the stand-by operation, when an upper stand-by time limit has elapsed since the fuel cell performs the stands-by operation.

13. The fuel cell system according to claim 1, further comprising:
an operation command unit configured to command the controller to execute the electric power generating operation interconnected with the power supply system, without receiving the command of the start of the electric power generating operation via the manual operation of the operator,
wherein the controller is configured to,
when the operation command unit commands the controller to execute the electric power generating operation interconnected with the power supply system, without receiving the command of the start of the electric power generating operation via the manual operation of the operator, start the electric power generating operation interconnected with the power supply system after the temperature of the hydrogen generating unit by the heater is equal to or higher than the threshold, without causing the fuel cell to perform the stand-by operation.

14. The fuel cell system according to claim 1, further comprising:
an electric power converter connected to the fuel cell for converting a DC power of the fuel cell to a AC power; and a parallel off unit connected between the electric power converter and an interconnection point of the power supply system, the parallel off unit electrically connecting and disconnecting the power supply system and the fuel cell system, wherein when the electric power generation start command unit receives the command of the start of the electric power generating operation, the controller is configured to turn on the parallel off unit and to connect the fuel cell with the power supply system.

15. The fuel cell system according to claim 1, wherein during the stand-by operation at the fuel cell, the hydrogen-containing gas is continuously supplied to the fuel cell.

16. The fuel cell system according to claim 1, wherein the oxidizing gas is supplied to the fuel cell after the electric power generation start command unit receives the command of the start of the electric power generating operation.

* * * * *